(12) United States Patent
Shirokane et al.

(10) Patent No.: US 11,807,023 B2
(45) Date of Patent: Nov. 7, 2023

(54) PRETREATMENT LIQUID, INK SET, IMAGE RECORDED MATERIAL, BASE MATERIAL FOR IMAGE RECORDING, METHOD OF PRODUCING BASE MATERIAL FOR IMAGE RECORDING, AND IMAGE RECORDING METHOD

(71) Applicant: FUJIFILM CORPORATION, Tokyo (JP)

(72) Inventors: Kenji Shirokane, Kanagawa (JP); Yusuke Fujii, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 736 days.

(21) Appl. No.: 16/997,944

(22) Filed: Aug. 20, 2020

(65) Prior Publication Data
US 2020/0376877 A1  Dec. 3, 2020

Related U.S. Application Data

(63) Continuation of application No. PCT/JP2019/012267, filed on Mar. 22, 2019.

(30) Foreign Application Priority Data

Mar. 30, 2018  (JP) ................................ 2018-069655

(51) Int. Cl.
| | | |
|---|---|---|
| *B41J 5/00* | (2006.01) | |
| *B41M 5/00* | (2006.01) | |
| *B41J 2/01* | (2006.01) | |
| *C09D 11/30* | (2014.01) | |
| *C09D 11/54* | (2014.01) | |

(52) U.S. Cl.
CPC .............. *B41M 5/0017* (2013.01); *B41J 2/01* (2013.01); *C09D 11/30* (2013.01); *C09D 11/54* (2013.01)

(58) Field of Classification Search
CPC ...... B41J 2/01; B41J 11/0015; B41M 5/0011; B41M 5/0017; B41M 5/0047; B41M 5/0064; B41M 5/5254; B41M 5/5272; B41M 5/5281; C09D 11/104; C09D 11/107; C09D 11/30; C09D 11/322; C09D 11/38; C09D 11/40; C09D 11/54
See application file for complete search history.

(56) References Cited

U.S. PATENT DOCUMENTS

| | | |
|---|---|---|
| 6,375,320 B1 | 4/2002 | Chu et al. |
| 2004/0090512 A1 | 5/2004 | Yau et al. |
| 2004/0090514 A1 | 5/2004 | Yau et al. |
| 2009/0226682 A1 | 9/2009 | Yatake |
| 2012/0128949 A1 | 5/2012 | Goto |
| 2013/0076842 A1 | 3/2013 | Sarkisian et al. |
| 2014/0220319 A1 | 8/2014 | Koike et al. |
| 2015/0252205 A1 | 9/2015 | Sarkisian et al. |
| 2016/0288535 A1 | 10/2016 | Sumikawa et al. |
| 2017/0247561 A1 | 8/2017 | Nakagawa et al. |

FOREIGN PATENT DOCUMENTS

| | | | | |
|---|---|---|---|---|
| CN | 101525513 A | 9/2009 | | |
| CN | 101379150 B | * 5/2012 | ............. | B41J 2/135 |
| CN | 102574406 A | 7/2012 | | |
| CN | 102933396 A | 2/2013 | | |
| CN | 103963462 A | 8/2014 | | |
| CN | 104662108 A | 5/2015 | | |
| CN | 106042701 A | 10/2016 | | |
| JP | 2000-318306 A | 11/2000 | | |
| JP | 2001-199154 A | 7/2001 | | |
| JP | 2001-277713 A | 10/2001 | | |
| JP | 2004-155200 A | 6/2004 | | |
| JP | 4285871 B2 | 6/2009 | | |
| JP | 2013220643 A | * 10/2013 | ............. | B41M 5/00 |
| JP | 2017-114934 A | 6/2017 | | |
| JP | 2017-222833 A | 12/2017 | | |
| JP | 2018-94902 A | 6/2018 | | |

OTHER PUBLICATIONS

Xu Binshi et al, "Theories and Technologies on Surface Engineering", National Defense Industry Press, 1st Edition, Apr. 2010, p. 168-169.

English language translation of the following: Office action dated Dec. 10, 2021, from the SIPO in a Chinese patent application No. 201980018589.9 corresponding to the instant patent application. This office action translation is submitted now in order to supplement the understanding of the cited reference which is being disclosed in the instant Information Disclosure Statement.

English language translation of the following: Office action dated May 30, 2022 from the SIPO in a Chinese patent application No. 201980018589.9 corresponding to the instant patent application.

English language translation of the following: Office action dated May 8, 2021 from the SIPO in a Chinese patent application No. 201980018589.9 corresponding to the instant patent application. This office action translation is submitted now in order to supplement the understanding of the cited references which are being disclosed in the instant Information Disclosure Statement.

(Continued)

*Primary Examiner* — Anh T Vo
(74) *Attorney, Agent, or Firm* — SOLARIS Intellectual Property Group, PLLC

(57) ABSTRACT

Provided are a pretreatment liquid for recording an image on an impermeable base material with an aqueous ink, the pretreatment liquid including an aqueous medium, a resin a having a glass transition temperature of lower than 25° C., and particles of a resin b having a glass transition temperature of 25° C. or higher; an ink set; a base material for image recording; an image recorded material; a method of producing a base material for image recording; and an image recording method.

20 Claims, No Drawings

(56) References Cited

OTHER PUBLICATIONS

Extended European Search Report dated May 11, 2021, issued in corresponding EP Patent Application No. 19776221.4.
English language translation of the following: Office action dated Oct. 19, 2021 from the JPO in a Japanese patent application No. 2020-509999 corresponding to the instant patent application.
International Search Report issued in International Application No. PCT/JP2019/012267 dated May 14, 2019.
Written Opinion of the ISA issued in International Application No. PCT/JP2019/012267 dated May 14, 2019.

* cited by examiner

PRETREATMENT LIQUID, INK SET, IMAGE RECORDED MATERIAL, BASE MATERIAL FOR IMAGE RECORDING, METHOD OF PRODUCING BASE MATERIAL FOR IMAGE RECORDING, AND IMAGE RECORDING METHOD

CROSS-REFERENCE TO RELATED APPLICATIONS

This application is a continuation application of International Application No. PCT/JP2019/012267, filed Mar. 22, 2019, which was published under PCT Article 21(2) in Japanese, and which claims priority from Japanese Patent Application No. 2018-069655, filed Mar. 30, 2018. Each of the above applications is hereby expressly incorporated by reference, in its entirety, into the present specification.

BACKGROUND OF THE INVENTION

1. Field of the Invention

The present disclosure relates to a pretreatment liquid, an ink set, an image recorded material, a base material for image recording, a method of producing a base material for image recording, and an image recording method.

2. Description of the Related Art

A recording method carried out using an ink jet method has been widely used because high-quality images can be recorded on various base materials by jetting an ink in the form of liquid droplets from a plurality of nozzles provided in an ink jet head.

Various forms of image recording methods carried out using an ink jet method have been suggested.

For example, a method of using an ink set formed by combining an ink (aqueous ink) that contains water and a colorant with a pretreatment liquid that contains a resin has been known. According to this method, for example, the adhesiveness of an image to an impermeable base material can be improved by bringing the pretreatment liquid and the impermeable base material into contact with each other.

For example, JP2017-222833A discloses a liquid composition for a surface treatment of a printed material, containing resin particles, a water-soluble salt, and water, in which the resin particles include a resin having a constitutional unit which has been specified.

For example, JP2017-114934A discloses a treatment liquid for an ink jet recording ink containing at least a cationic or nonionic resin which has a polyurethane structure, an organic acid, and water, in which the organic acid has a first dissociation constant of 3.5 or less, and the pH of the treatment liquid is less than the first dissociation constant of the organic acid.

SUMMARY OF THE INVENTION

In JP2017-222833A and JP2017-114934A of the related art, only one kind of resin (including resin particles) is used in the treatment liquid, but there is a problem in that the adhesiveness between the treatment liquid and the impermeable base material is impaired due to the reason that fusing and welding of resin particles are not sufficient or the drying properties are not satisfactory in a case where only one kind of resin (including resin particles) is used in the treatment liquid.

Therefore, an object to be achieved by an aspect of the present disclosure is to provide a pretreatment liquid, an ink set, an image recorded material, a base material for image recording, and a method of producing a base material for image recording, in which transfer of components contained in the pretreatment liquid from a recording surface is suppressed in a case of recording an image on an impermeable medium and an image with excellent adhesiveness can be recorded.

Further, an object to be achieved by another aspect of the present disclosure is to provide an image recording method, in which transfer of components contained in the pretreatment liquid from a recording surface is suppressed in a case of recording an image on an impermeable medium and an image with excellent adhesiveness can be recorded.

Specific means for achieving the above-described objects includes the following aspects.

<1> A pretreatment liquid for recording an image on an impermeable base material with an aqueous ink, the pretreatment liquid comprising: an aqueous medium; a resin a having a glass transition temperature of lower than 25° C.; and particles of a resin b having a glass transition temperature of 25° C. or higher.

<2> The pretreatment liquid according to <1>, in which a mass ratio (b:a) of the resin b to the resin a is in a range of 1.5:1 to 100:1.

<3> The pretreatment liquid according to <1> or <2>, in which the mass ratio b:a of the resin b to the resin a is in a range of 3:1 to 20:1.

<4> The pretreatment liquid according to any one of <1> to <3>, in which the glass transition temperature of the resin b is 30° C. or higher, and the glass transition temperature of the resin a is 20° C. or lower.

<5> The pretreatment liquid according to any one of <1> to <4>, in which a difference between the glass transition temperature of the resin b and the glass transition temperature of the resin a is 15° C. or higher.

<6> The pretreatment liquid according to any one of <1> to <5>, in which the glass transition temperature of the resin a is in a range of 0° C. to 20° C.

<7> The pretreatment liquid according to any one of <1> to <6>, in which the glass transition temperature of the resin b is in a range of 30° C. to 90° C.

<8> The pretreatment liquid according to any one of <1> to <7>, in which a distance of a Hansen solubility parameter between the resin b and the resin a is in a range of 0 $MPa^{1/2}$ to 2 $MPa^{1/2}$.

<9> The pretreatment liquid according to any one of <1> to <8>, in which a distance of the Hansen solubility parameter between the resin b and the aqueous medium is in a range of 33 $MPa^{1/2}$ to 41 $MPa^{1/2}$.

<10> The pretreatment liquid according to any one of <1> to <9>, in which the resin b is an ester resin or an acrylic resin.

<11> The pretreatment liquid according to any one of <1> to <10>, in which the resin a is an ester resin or an acrylic resin.

<12> The pretreatment liquid according to any one of <1> to <11>, in which the resin a and the resin b are acrylic resins.

<13> The pretreatment liquid according to any one of <1> to <12>, further comprising: at least one aggregating agent selected from the group consisting of a polyvalent metal salt, an organic acid, a metal complex, and a water-soluble cationic polymer.

<14> The pretreatment liquid according to any one of <1> to <13>, in which the pretreatment liquid contains core shell particles containing the resin a as a shell and the particles of the resin b as a core.

<15> An ink set comprising: an ink composition containing a colorant and water; and the pretreatment liquid according to any one of <1> to <14>.

<16> A base material for image recording, comprising: an impermeable base material; and a pretreatment layer containing a solid content of the pretreatment liquid according to any one of <1> to <14>, is the pretreatment layer provided on at least one surface of the impermeable base material.

<17> A base material for image recording with an aqueous ink, comprising: an impermeable base material; and a pretreatment layer which includes a resin a having a glass transition temperature of lower than 25° C. and particles of a resin b having a glass transition temperature of 25° C. or higher.

<18> An image recorded material comprising: the base material for image recording according to <16> or <17>; and an image containing a colorant.

<19> A method of producing a base material for image recording, comprising: a step of adding the pretreatment liquid according to any one of <1> to <14> onto an impermeable base material.

<20> An image recording method comprising: a step of adding the pretreatment liquid according to any one of <1> to <14> onto an impermeable base material; and a step of allowing an ink composition containing a colorant and water to be jetted according to an ink jet method onto a surface of the impermeable base material onto which the pretreatment liquid has been applied and recording an image.

According to an aspect of the present disclosure, it is possible to provide a pretreatment liquid, an ink set, an image recorded material, a base material for image recording, and a method of producing a base material for image recording, in which transfer of components contained in the pretreatment liquid from a recording surface is suppressed (blocking resistance) in a case of recording an image on an impermeable medium and an image with excellent adhesiveness can be recorded.

Further, according to another aspect of the present disclosure, it is possible to provide an image recording method, in which transfer of components contained in the pretreatment liquid from a recording surface is suppressed in a case of recording an image on an impermeable medium and an image with excellent adhesiveness can be recorded.

DESCRIPTION OF THE PREFERRED EMBODIMENTS

In the present disclosure, the numerical ranges shown using "to" indicate ranges including the numerical values described before and after "to" as the lower limits and the upper limits. In a numerical range described in a stepwise manner in the present disclosure, an upper limit or a lower limit described in a certain numerical range may be replaced with an upper limit or a lower limit in another numerical range described in a stepwise manner. Further, in a numerical range described in the present disclosure, an upper limit or a lower limit described in a certain numerical range may be replaced with a value described in an example.

In the present disclosure, in a case where a plurality of substances corresponding to respective components in a composition are present, the amount of the respective components in the composition indicates the total amount of the plurality of substances present in the composition unless otherwise specified.

In the present disclosure, the meaning of the term "step" includes not only an independent step but also a step whose intended purpose is achieved even in a case where the step is not clearly distinguished from other steps.

In the present disclosure, "image recording" or "recording an image" means that an image is drawn on a base material using a pretreatment liquid (or a pretreatment layer containing a solid content of the pretreatment liquid) and an ink and the drawn image is fixed.

In the present disclosure, "(meth)acryl" indicates at least one of acryl or methacryl, and "(meth)acrylate" indicates at least one of acrylate or methacrylate.

In the present disclosure, the "aqueous ink" indicates an ink composition containing at least a colorant or water.

In the present disclosure, the "solid content" indicates the total mass of components excluding an aqueous medium.

In the present disclosure, the term "water-soluble" indicates a property in which a substance is dissolved in water at a certain concentration or higher. As the "water-soluble" property, a property in which the amount of a substance to be dissolved in 100 g of water at 25° C. is 5 g or greater (more preferably 10 g or greater) is preferable.

In the present disclosure, a combination of two or more preferable aspects is a more preferable aspect.

<Pretreatment Liquid>

A pretreatment liquid according to the embodiment of the present disclosure is a pretreatment liquid for recording an image on an impermeable base material with an aqueous ink, the pretreatment liquid including an aqueous medium, a resin a having a glass transition temperature of lower than 25° C., and particles of a resin b having a glass transition temperature of 25° C. or higher.

In JP2017-222833A and JP2017-114934A of the related art, only one kind of resin (including resin particles) is used in the pretreatment liquid, but there is a problem in that the adhesiveness between the pretreatment liquid and the impermeable base material is not satisfactorily improved due to the reason that fusing and welding of resin particles are not sufficient.

The present inventors have found that the above-described problems are solved in a case where the pretreatment liquid according to the embodiment of the present disclosure contains a plurality of resins having different glass transition temperatures.

That is, in a case where the pretreatment liquid contains at least two kinds of resin components, a resin having a relatively low glass transition temperature is allowed to be contained in the pretreatment liquid so that the resin having a low glass transition temperature enters between particles of the resin having a high glass transition temperature, and thus the adhesiveness between the pretreatment layer and the impermeable base material is improved. Further, transfer of components in the treatment liquid due to unsatisfactory drying properties, which is a defect in a case where a large amount of a resin having a relatively low glass transition temperature is contained in the pretreatment liquid, is solved by allowing the pretreatment liquid to contain a resin having a high glass transition temperature. As a result, it is possible to record an image having excellent blocking resistance, aggregating agent blocking resistance, and adhesiveness.

Hereinafter, each component contained in the pretreatment liquid according to the embodiment of the present disclosure will be described in detail.

(Resin a)

The pretreatment liquid according to the embodiment of the present disclosure contains a resin a having a glass transition temperature of lower than 25° C. In this manner, glass transition is caused by the resin a at lower than room temperature (25° C.), and the adhesiveness between the impermeable base material and the pretreatment liquid, and the ink and the pretreatment liquid described below can be improved.

The resin a used in the present disclosure has a glass transition temperature (Tg) of lower than 25° C. In this manner, glass transition is caused by the resin a at room temperature (25° C.) so that tackiness easily occurs, and the adhesiveness between the pretreatment liquid and the impermeable base material is improved.

From the same viewpoint as described above, the glass transition temperature (Tg) of the resin a is more preferably in a range of −40° C. to 20° C. and still more preferably in a range of 5° C. to 15° C.

In the present disclosure, the glass transition temperature of a resin can be measured using differential scanning calorimetry (DSC).

Specifically, the measuring method is performed in conformity with the method described in JIS K 7121 (1987) or JIS K 6240 (2011). As the glass transition temperature in the present specification, an extrapolated glass transition start temperature (hereinafter, also referred to as Tig) is used.

The method of measuring the glass transition temperature will be described in more detail.

In a case where the glass transition temperature is acquired, the resin is maintained at a temperature lower than the expected Tg of the resin by approximately 50° C. until the device is stabilized, the resin is heated to a temperature higher than the temperature at which the glass transition is completed by approximately 30° C. at a heating rate of 20° C./min, and a differential thermal analysis (DTA) curve or a DSC curve is created.

The extrapolated glass transition start temperature (Tig), that is, the glass transition temperature Tg in the present specification is acquired as the temperature of the intersection between a straight line obtained by extending the base line on a low temperature side in the DTA curve or the DSC curve onto a high temperature side and a tangent drawn at a point where the gradient of a curve from a step-like change portion of the glass transition is maximized.

In the present disclosure, the glass transition temperature in a case where the pretreatment liquid contains a plurality of resins a is a value calculated as an average value of all resins included as the resins a by integrating the glass transition temperature of each resin at a mass ratio of each resin, and this value is set as the glass transition temperature of the resin a.

It is preferable that the resin a used in the present disclosure is a water-soluble or water-dispersible polymer.

In the present specification, the "water-soluble" indicates a property in which a substance is dissolved in water at a certain concentration or higher. As the "water-soluble" property, a property in which the amount of a substance to be dissolved in 100 g of water at 25° C. is 5 g or greater (more preferably 10 g or greater) is preferable.

In the present disclosure, the "water dispersibility" indicates a state where a compound that is not water-soluble does not cause precipitation in water at 25° C. Specifically, the state indicates a state where the compound is dissolved in water, a state where the compound forms a micelle in water, a state where the compound is uniformly dispersed in water, or the like.

The resin a may be in any form of a linear polymer, a graft polymer, a star polymer, and a network polymer. Among these, a linear polymer is preferable.

Further, the form of the resin a in the pretreatment liquid is not particularly limited, and the resin a may be in a form of particles or a form of being dissolved in water, a solvent, or the like.

[Distance of Hansen Solubility Parameter (HSP Distance)]

The HSP distance between the resin a and the aqueous medium in the present disclosure is preferably in a range of 33 MPa$^{1/2}$ to 41 MPa$^{1/2}$. In a case where the HSP distance is 33 MPa$^{1/2}$ or greater, it is possible to avoid deterioration of the drying properties and degradation of the blocking resistance. In a case where the HSP distance is 41 MPa$^{1/2}$ or less, it is possible to prevent degradation of the fusing and welding properties between particles and degradation of the adhesiveness.

The HSP distance between the resin a and the aqueous medium is more preferably in a range of 35 MPa$^{1/2}$ to 40 MPa$^{1/2}$ and more preferably in a range of 37 MPa$^{1/2}$ to 39 MPa$^{1/2}$.

The HSP is the Hansen solubility parameter. The HSP is a value obtained by quantifying the solubility of a certain substance (X) in another substance (Z) using multidimensional vectors. It is indicated that the substance is easily dissolved in another substance (the compatibility is high) as the distance between vectors of X and Z is reduced.

In the present disclosure, three vectors (SD (dispersion element), δP (polarization element), and δH (hydrogen bond element)) are determined using HSPiP software (see https://www.pirika.com/JP/HSP/index.html, https://www.hansen-solubility.com/index.php?id=11) for the HSPs of the "aqueous medium" and the "resin". The HSP distance is defined as a value calculated by applying SD (dispersion element), SP (polarization element), and δH (hydrogen bond element) of each of two kinds of objects expected to be compared to each other to the following equation. For example, the HSP distance between the resin and the aqueous medium can be acquired by setting the dispersion element of the resin as $\delta D_1$, the hydrogen bond element thereof as $\delta P_1$, and the dispersion element thereof as $\delta H_1$ and the dispersion element of the aqueous medium as $\delta D_2$, the polarization element thereof as $\delta P_2$, and the hydrogen bond element thereof $\delta H_2$ and applying these vectors to the following equation.

Further, similarly, the HSP distance between resins can be acquired by setting the dispersion element of one resin as $\delta D_1$, the hydrogen bond element thereof as $\delta P_1$, and the dispersion element thereof as $\delta H_1$ and the dispersion element of the other resin as $\delta D_2$, the polarization element thereof as $\delta P_2$, and the hydrogen bond element thereof $\delta H_2$ and applying these vectors to the following equation.

$$HSP\ \text{distance} = \sqrt{4(\delta D_1 - \delta D_2)^2 + (\delta P_1 - \delta P_2)^2 + (\delta H_1 - \delta H_2)^2}$$

Hereinafter, the method of calculating the HSP distance between the resin and the aqueous medium will be described below in detail.

—Calculation of $\delta D_1$, $\delta P_1$, and $\delta H_1$ of Resin—

The vectors δD1, δP1, and δH1 of the resin are obtained by calculating δD, δP, and δH for each constitutional unit constituting the resin, multiplying δD, δP, and δH by the mole fraction of each constitutional unit in the resin, and calculating the sum of the obtained values.

First, as shown in Table 1, the structural formula for HSP calculation of each constitutional unit of the resin is converted into a Smiles notation using structural formula editor software (ChemBioDraw Ultra 13.0). Thereafter, the bonding point * of the obtained Smiles notation polymer is rewritten to X, and the values of δD, δP, and δH of each constitutional unit are calculated by Y-MB of HSPiP (HSPiP 4th edition 4.1.07).

TABLE 1

| Structural formula for HSP calculation | Smile notation | HSP δD | δP | δH |
|---|---|---|---|---|
| HEMA | O=C(OCCO)C(X)(C)CX | 17.2 | 5.3 | 12.4 |
| IBOMA | XCC(C(OC1CC2CCC1(C)C2(C)C)=O)(C)X | 16.9 | 0.9 | 1.3 |
| MMA | O=C(OC)C(CX)(C)X | 16.6 | 1.8 | 4.0 |
| MAA | XC(CX)(C)C(O)=O | 17.0 | 3.4 | 12.6 |

Each component in Table 1 is as follows.
HEMA: hydroxyethyl methacrylate
IBOMA: isobornyl methacrylate
MMA: methyl methacrylate
MAA: methacrylic acid In the resins formed of the constitutional units listed in Table 1, the vectors $δD_1$, $δP_1$ and $δH_1$ are calculated as follows in a case where the mole fractions of HEMA, IBOMA, MMA, and MAA are respectively 0.21, 0.24, 0.40, and 0.15.

$δD_1$=0.21×17.2 (HEMA)+0.24×16.9 (IBOMA)+0.40×16.6 (MMA)+0.15×17.0 (MAA)≈16.9

$δP_1$=0.21×5.3 (HEMA)+0.24×0.9 (IBOMA)+0.40×1.8 (MMA)+0.15×3.4 (MAA)≈2.6

$δH_1$=0.21×12.4 (HEMA)+0.24×1.3 (IBOMA)+0.40×4.0 (MMA)+0.15×12.6 (MAA)≈6.4

—Calculation of $δD_2$, $δP_2$, and $δH_2$ of Aqueous Medium—

The vectors δD, δP, and δH for each compound constituting the aqueous medium were obtained by being derived from the registration data of HSPiP (HSPiP 4th edition 4.1.07), multiplying δD, δP, and δH by the volume fraction of each compound in the aqueous medium, and calculating the sum of the obtained values. The volume fraction is a volume fraction at 25° C. and 1 atm.

First, it is assumed that the aqueous medium is a mixed liquid of water and propylene glycol (PG), and the volume ratio of water and PG is water:PG=78:22 (volume ratio). Table 2 shows δD, δP, and δH of water and PG

TABLE 2

| | HSP(Registered value) | | |
|---|---|---|---|
| | δD | δP | δH |
| Water | 15.5 | 16.0 | 42.3 |
| PG | 16.8 | 10.4 | 21.3 |

The vectors $δD_2$, $δP_2$, and $δH_2$ are calculated as follows.
$δD_2$=0.78×15.5 ($H_2O$)+0.22×16.8 (PG)≈15.8
$δP_2$=0.78×16.0 ($H_2O$)+0.22×10.4 (PG)≈14.8
$δH_2$=0.78×42.3 (H2O)+0.22×21.3 (PG)≈37.7

As described above, the HSP distance between the resin and the aqueous medium is as follows.

HSP distance=$\{4×(16.9-15.8)^2+(2.6-14.8)^2+(6.4-37.7)^2\}^{1/2}$≈33.7

[Content]

From the viewpoint of improving the adhesiveness between the pretreatment liquid and the ink containing a colorant and water and the adhesiveness between the pretreatment liquid and the impermeable base material, the content of the resin a in the pretreatment liquid according to the embodiment of the present disclosure is preferably in a range of 1% by mass to 25% by mass, more preferably in a range of 2% by mass to 20% by mass, and still more preferably in a range of 3% by mass to 15% by mass with respect to the total mass of the pretreatment liquid.

In a case where the resin a has a low affinity for a solvent (for example, water) (for example, in a case where the hydrogen bonding property of the resin is low), the drying properties are satisfactory, and the blocking resistance, the aggregating agent blocking resistance, and the adhesiveness are improved.

From the above-described viewpoint, as the resin a, an acrylic resin, an ester resin, or a urethane resin is preferable, an acrylic resin or an ester resin is more preferable, and an acrylic resin is still more preferable.

In a case where the resin a is resin particles, it is preferable that the resin particles are particles of a self-dispersing resin (self-dispersing resin particles).

Details of the self-dispersing resin particles that can be used in the present disclosure are as described in paragraphs 0140 to 0144 of WO2017/163738A.

(Acrylic Resin)

It is preferable that the acrylic resin has at least a constitutional unit derived from a first monomer containing at least one group selected from a sulfo group and a salt of the sulfo group and a constitutional unit derived from a second monomer having at least one structure selected from an aromatic ring structure and an alicyclic structure. Further, as necessary, the acrylic resin may further have constitutional units derived from other monomers.

—Constitutional Unit Derived from First Monomer—

It is preferable that the constitutional unit derived from the first monomer is a constitutional unit present in the resin which is obtained by copolymerizing the first monomer containing at least one group selected from a sulfo group and a salt of the sulfo group with at least the second monomer described below. The surface of each particle of the acrylic resin is hydrophilized by copolymerizing the first monomer so as to contain a sulfo group or a salt of the sulfo group.

The first monomer containing at least one group selected from a sulfo group and a salt of the sulfo group is not particularly limited as long as the first monomer contains a sulfo group or a salt of the sulfo group, or a sulfo group and a salt of the sulfo group. The constitutional unit derived from the first monomer may be appropriately selected from the group consisting of a constitutional unit derived from a monomer containing a sulfo group or a salt of the sulfo group or a constitutional unit derived from a monomer containing a sulfo group and a salt of the sulfo group. The first monomer may be contained alone or in combination of two or more kinds thereof.

Among these, a constitutional unit represented by General Formula 1 is preferable as the constitutional unit derived from the first monomer.

General Formula 1

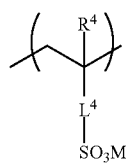

In General Formula 1, $R^4$ represents a methyl group or a hydrogen atom.

Further, $L^4$ in General Formula 1 represents a single bond or a divalent linking group in which one or two or more selected from the group consisting of a chain-like, branched, or cyclic alkylene group having 1 to 10 carbon atoms, an arylene group having 6 to 10 carbon atoms, —O—, —NH—, —S—, —C(=O)—, and —CH(—OH)— are linked to one another.

$L^4$ represents preferably a divalent linking group in which one or two or more selected from the group consisting of a chain-like, branched, or cyclic alkylene group having 1 to 5 carbon atoms, —O—, —NH—, and —C(=O)— and more preferably a chain-like, branched, or cyclic alkylene group having 1 to 5 carbon atoms, a divalent linking group consisting of a chain-like, branched, or cyclic alkylene group having 1 to 5 carbon atoms, —O—, and —C(=O)—, or a divalent linking group consisting of a chain-like, branched, or cyclic alkylene group having 1 to 5 carbon atoms, —NH—, and —C(=O)—.

$L^4$ represents still more preferably at least one linking group selected from the following group a. In the linking group shown in the group a, n represents an integer of 1 to 5, and the symbol * represents a bonding position.

[Group a]

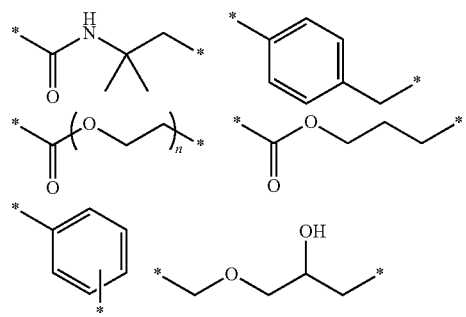

In General Formula 1, M represents a hydrogen atom or a cation.

Examples of the cation as M include an alkali metal ion such as a sodium ion, a potassium ion, or a lithium ion; an alkaline earth metal ion such as a calcium ion or a magnesium ion; and an ion such as an ammonium ion.

Examples of the constitutional unit represented by General Formula 1 include constitutional units derived from monomers having 2-acrylamido-2-methylpropanesulfonic acid, acrylamido-2-propanesulfonic acid, vinylsulfonic acid, styrenesulfonic acid, α-methylstyrenesulfonic acid, 2-sulfoethyl (meth)acrylate, 3-sulfopropyl (meth)acrylate, methacryloyloxyethylsulfonic acid, vinylbenzylsulfonic acid, 1-allyloxy-2-hydroxypropanesulfonic acid, allyloxy polyethylene glycol (degree of polymerization of the ethylene glycol moiety. 10), sulfonic acid, and salts thereof.

Examples of the counter ion of the salt include an alkali metal ion such as a sodium ion, a potassium ion, or a lithium ion; and an alkaline earth metal ion such as a calcium ion or a magnesium ion; and an ion such as an ammonium ion.

Further, as a method of introducing at least one group selected from a sulfo group and a salt of the sulfo group into an acrylic resin, a monomer containing at least one group selected from a sulfo group and a salt of the sulfo group is copolymerized. In a case where a salt of a sulfo group is introduced into an acrylic resin, a monomer containing a sulfo group may be copolymerized to synthesize particles of an acrylic resin and then neutralized with a base to obtain a salt of a sulfo group.

Among the constitutional units derived from a monomer containing at least one group selected from a sulfo group and a salt of the sulfo group, constitutional units derived from acrylamido-2-propanesulfonic acid, a salt of acrylamido-2-propanesulfonic acid, or 3-sulfopropyl (meth)acrylate are preferable. As the counter ion in the salt, a sodium ion, a potassium ion, a lithium ion, and an ammonium ion are preferable.

Among these, acrylamido-2-propanesulfonic acid and sodium acrylamido-2-propanesulfonate are more preferable.

Hereinafter, specific examples of the constitutional unit derived from a monomer containing at least one group selected from a sulfo group and a salt of the sulfo group will be described. However, the present disclosure is not limited to the following specific examples.

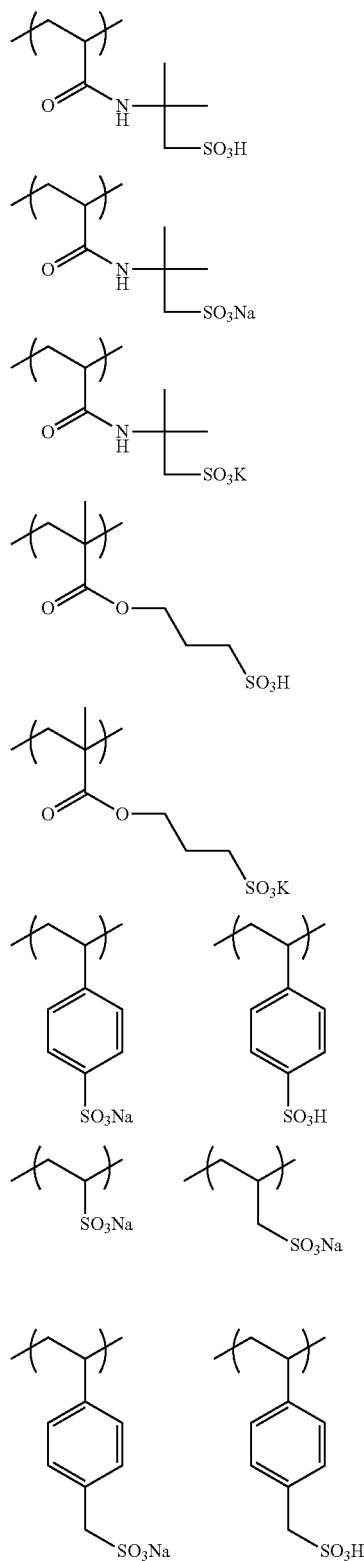

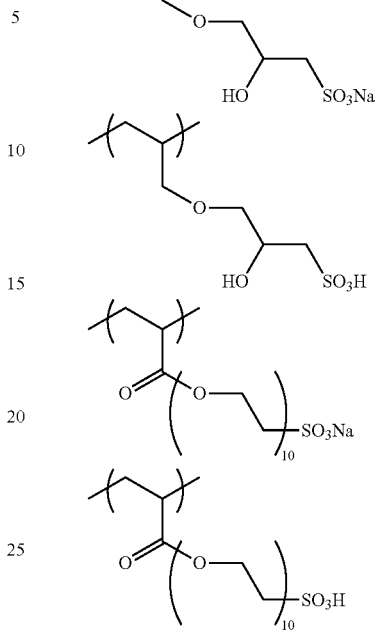

In the acrylic resin, the content ratio of the constitutional unit derived from the first monomer containing at least one group selected from a sulfo group and a salt of the sulfo group in the acrylic resin is preferably in a range of 3% by mass to 25% by mass, more preferably in a range of 5% by mass to 20% by mass, and particularly preferably in a range of 7% by mass to 15% by mass with respect to the total mass of the acrylic resin.

In a case where the content ratio of the constitutional unit derived from the first monomer is 3% by mass or greater, the surface of a particle is suitable for hydrophilization, and the surface of the base material is suitable for being subjected to a hydrophilic treatment. Further, in a case where the content ratio of the constitutional unit derived from the first monomer is 25% by mass or less, the balance with the degree of hydrophobicity inside the particles is excellent, swelling of the particles is unlikely to occur, and stable dispersion stability is obtained.

—Constitutional Unit Derived from Second Monomer—

The constitutional unit derived from the second monomer is a constitutional unit present in the resin obtained by copolymerizing the second monomer having at least one structure selected from an aromatic ring structure and an alicyclic structure with at least the above-described first monomer. By copolymerizing the second monomer so as to have an aromatic ring structure or an alicyclic structure in a molecule, the hydrophobicity inside the particles of the acrylic resin can be improved as compared with a case where the second monomer has an aliphatic structure such as an alkyl chain.

The constitutional unit derived from the second monomer is a hydrophobic constitutional unit and does not contain a sulfo group nor a salt of the sulfo group. Therefore, the constitutional unit derived from the second monomer is distinguished from the constitutional unit derived from the first monomer containing at least one group selected from a sulfo group and a salt of the sulfo group described above in terms that the constitutional unit derived from the second monomer does not contain a sulfo group and a salt of the sulfo group.

The second monomer having at least one structure selected from an aromatic ring structure and an alicyclic structure is not particularly limited as long as the second monomer is a monomer having an aromatic ring structure or an alicyclic structure, or an aromatic ring structure and an alicyclic structure. The constitutional unit derived from the second monomer may be appropriately selected from the group consisting of a constitutional unit derived from a monomer having an aromatic ring structure or an alicyclic structure and a constitutional unit derived from a monomer having an aromatic ring structure and an alicyclic structure. The second monomer may be contained alone or in combination of two or more kinds thereof.

Among these, a constitutional unit selected from the group consisting of constitutional units represented by any of General Formulae A to E is preferable as the constitutional unit derived from the second monomer.

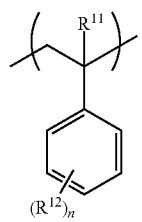

General Formula A

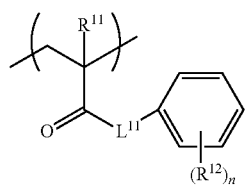

General Formula B

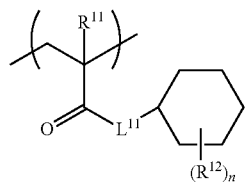

General Formula C

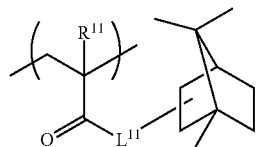

General Formula D

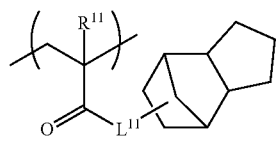

General Formula E

In General Formulae A to E, $R^{11}$ represents a methyl group or a hydrogen atom.

Further, $R^{12}$ in General Formulae A to C represents a hydrogen atom or a chain-like or branched alkyl group having 1 to 10 carbon atoms. Examples of the chain-like or branched alkyl group having 1 to 10 carbon atoms include a methyl group, an ethyl group, an n-propyl group, an i-propyl group, and a t-butyl group. $R^{12}$ represents preferably a hydrogen atom or a chain-like or branched alkyl group having 4 to 10 carbon atoms and more preferably a hydrogen atom or a methyl group. Further, $R^{12}$ may be an unsubstituted group or a group substituted with a substituent. In a case where $R^{12}$ is substituted with a substituent, examples of the substituent include a halogen atom (such as a chlorine atom or a bromine atom) and an alkyl group (such as a methyl group or an ethyl group).

n in General Formulae A to C represents an integer of 0 to 5. In a case where n represents 2 or greater, a plurality of $R^{12}$'s may represent the same group or different groups.

In General Formulae B to E, $L^{11}$ represents a single bond or a divalent linking group in which one or two or more selected from the group consisting of a chain-like, branched, or cyclic alkylene group having 1 to 18 carbon atoms, an arylene group having 6 to 18 carbon atoms, —O—, —NH—, —S—, and —C(=O)— are linked to one another.

Examples of the chain-like, branched, or cyclic alkylene group having 1 to 18 carbon atoms include a methylene group, an ethylene group, an i-propylene group, a t-butylene group, and an n-propylene group.

Examples of the arylene group having 6 to 18 carbon atoms include a phenylene group, a naphthylene group, and a tolyl group.

Among these, it is preferable that $L^{11}$ represents a divalent linking group shown below. In the following divalent linking groups, $R^{21}$'s each independently represent a methyl group or a hydrogen atom. n represents an integer of 1 to 8.

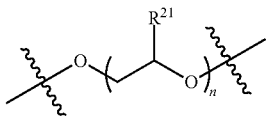

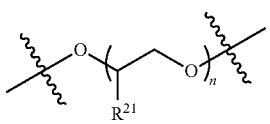

Hereinafter, specific examples of the constitutional unit derived from the second monomer having at least one structure selected from an aromatic ring structure and an alicyclic structure will be described. However, the present disclosure is not limited to the following specific examples.

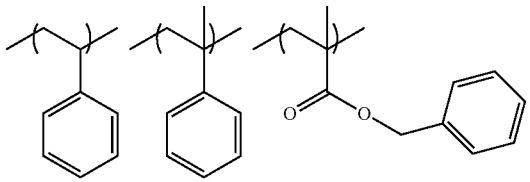

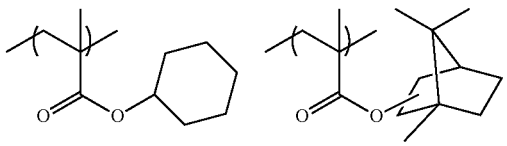

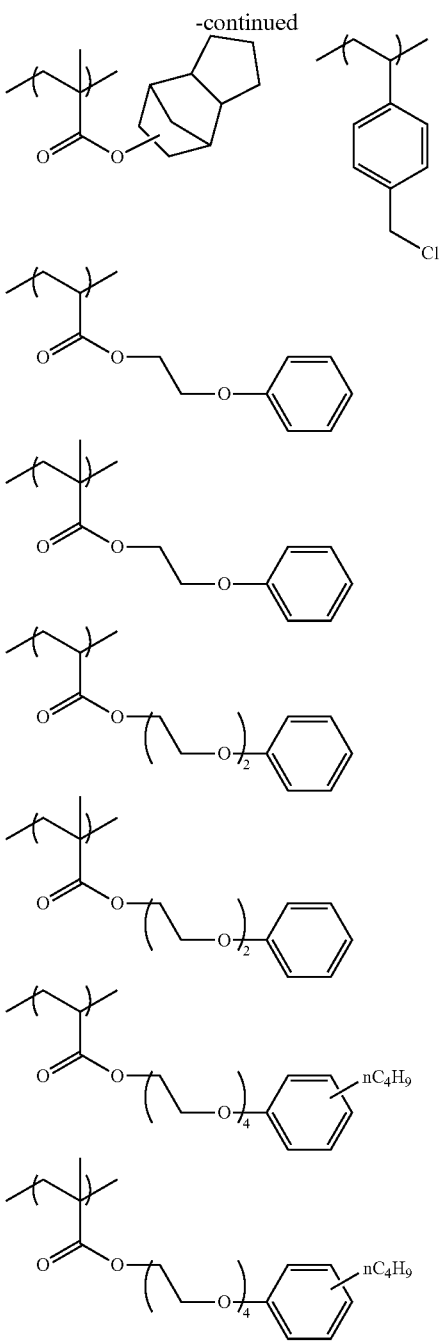

Among these above, as the second monomer, a constitutional unit represented by General Formula A is preferable. Among such examples, styrene is particularly preferable. In a case where the acrylic resin has the constitutional unit represented by General Formula A, the proportion of oxygen atoms in the molecule of the acrylic resin decreases, and the effect of suppressing the decrease in the density of a solid image is high. In addition, since styrene is a compound more hydrophobic than a monomer having an element other than the carbon atom and the hydrogen atom, swelling of particles is prevented and dispersion stability of particles is further improved.

The content ratio of the total content of the constitutional units derived from the second monomer having at least one structure selected from an aromatic ring structure and an alicyclic structure (preferably constitutional units represented by any of General Formulae A to E) in the acrylic resin can be set to be in a range of 2% by mass to 80% by mass, preferably in a range of 10% by mass to 40% by mass, and more preferably in a range of 20% by mass to 40% by mass with respect to the total mass of the acrylic resin.

In particular, in a case where the total content ratio of the constitutional units represented by any of General Formulae A to E is 5% by mass or greater, the inside of the particles of the acrylic resin is suitable for hydrophobization, swelling of the particles in a case of being present in an aqueous treatment liquid is easily prevented, and the dispersion stability of the particles in the treatment liquid is more excellent.

In the second monomer, the ratio of the mass of oxygen atoms in the second monomer to the molecular weight of the second monomer is preferably 0.1 or less. It is preferable that the ratio of the mass of oxygen atoms to the molecular weight of the second monomer is 0.1 or less from the viewpoint that the second monomer is unlikely to be unevenly distributed on the surface and is localized inside. Further, the ratio of the mass of oxygen atoms to the molecular weight of the second monomer can be selected from a range of 0 or greater. The ratio of the mass of oxygen atoms to the molecular weight of the second monomer is preferable as the ratio decreases and, the ratio thereof is particularly preferably 0.

Further, the ratio (the constitutional unit derived from the first monomer/the constitutional unit derived from the second monomer) of the content (the total content in a case of having two or more kinds of constitutional units derived from the first monomer) of the constitutional unit derived from the first monomer containing at least one group selected from a sulfo group and a salt of the sulfo group to the content (the total content in a case of having two or more kinds of constitutional units derived from the second monomer) of the constitutional unit derived from the second monomer having at least one structure selected from an aromatic ring structure and an alicyclic structure (preferably a constitutional unit represented by any of General Formulae A to E) is preferably in a range of 0.05 to 4.0, more preferably in a range of 0.05 to 2.0, still more preferably in a range of 0.10 to 0.90, and most preferably in a range of 0.10 to 0.50 on a mass basis.

In a case where the ratio of the content of the constitutional unit derived from the first monomer to the content of the constitutional unit derived from the second monomer is in the above-described range, the balance between the hydrophilicity of the hydrophilic group selected from a sulfo group and a salt of the sulfo group and the hydrophobicity of the hydrophobic group selected from an aromatic ring structure and an alicyclic structure is excellent, and the adhesiveness for appropriate drying properties can be imparted.

—Constitutional Units Derived from Other Monomers—

The acrylic resin may have constitutional units derived from monomers other than the constitutional unit derived from the first monomer and the constitutional unit derived from the second monomer. Examples of the constitutional units derived from other monomers include a constitutional unit derived from a monomer containing at least one group selected from a carboxy group and a salt of a carboxy group, and constitutional units derived from other monomers shown below.

The constitutional units derived from other monomer are distinguished from the constitutional unit derived from the first monomer and the constitutional unit derived from the second monomer described above in terms that the constitutional units derived from other monomers do not have any of a sulfo group, a salt of the sulfo group, an aromatic ring structure, and an alicyclic structure.

The weight-average molecular weight of the acrylic resin is preferably in a range of 3000 to 200000, more preferably in a range of 5000 to 150000, and still more preferably in a range of 10000 to 100000. In a case where the weight-average molecular weight thereof is set to 3000 or greater, the amount of water-soluble components can be effectively suppressed. Further, in a case where the weight-average molecular weight is 200000 or less, the dispersion stability can be improved.

The weight-average molecular weight is a value measured by gel permeation chromatography (GPC).

Specifically, the measurement according to GPC is performed using HLC (registered trademark)-8220GPC (manufactured by Tosho Corporation) as a measuring device, three columns of TSKgel, Super Multipore HZ-H (manufactured by Tosho Corporation, 4.6 mmID×15 cm), and tetrahydrofuran (THF) as an eluent. Further, as the measurement conditions, the measurement is performed at a sample concentration of 0.45% by mass, a flow rate of 0.35 ml/min, a sample injection volume of 10 μl, and a measurement temperature of 40° C. using a refractive index (RI) detector. Further, the calibration curve is prepared using eight samples of "F-40", "F-20", "F-4", "F-1", "A-5000", "A-2500", "A-1000", and "n-propylbenzene" which are "Standard Samples TSK standard, polystyrene" (manufactured by Tosoh Corporation).

Examples of the constitutional units derived from other monomers include constitutional units derived from acrylic acid esters (for example, methacrylic acid esters such as methyl methacrylate, ethyl methacrylate, and 2-hydroxyethyl methacrylate; methyl acrylate, 2-hydroxyethyl acrylate, and the like), amide monomers (for example, acrylamide, N-(2-hydroxyethyl)acrylamide, N,N-dimethylacrylamide, N,N-diethylacrylamide, isopropylacrylamide, N-(2-hydroxymethyl)acrylamide, and methacrylamide), vinyl cyanide-based monomers (for example, acrylonitrile and methacrylonitrile), ethylenically unsaturated carboxylic acid hydroxyalkyl ester-based monomers (for example, β-hydroxyethyl acrylate and β-hydroxyethyl methacrylate), tertiary salts such as a hydrochloride and a sulfate of dialkylaminoalkyl (meth)acrylate (for example, dimethylaminoethyl (meth)acrylate, diethylaminoethyl (meth)acrylate, dimethylaminoethyl (meth)acrylate, and diethylamino-2-hydroxypropyl (meth)acrylate, and dimethylaminopropyl (meth)acrylate), and tertiary salts such as a hydrochloride and a sulfate of dialkylaminoalkyl (meth)acrylamide (for example, dimethylaminoethyl (meth)acrylamide), cationic monomers (for example, quaternary salts such as a halogenated alkyl adduct of dialkylaminoalkyl (meth)acrylate (for example, a methyl chloride adduct) and a halogenated aryl adduct (for example, a benzyl chloride adduct) and quaternary salts such as a halogenated alkyl adduct of dialkylaminoalkyl (meth)acrylamide (for example, a methyl chloride adduct) and a halogenated aryl adduct (for example, a benzyl chloride adduct)), and bifunctional (meth)acrylate (for example, ethylene glycol dimethacrylate, ethylene glycol methacrylate, diethylene glycol dimethacrylate, or diethylene glycol methacrylate). However, examples of the constitutional units derived from other monomers are not limited to the above-described constitutional units.

The constitutional units derived from other monomers may be contained alone or in combination of two or more kinds thereof.

The content of the constitutional units derived from other monomers can be set to be in a range of 20% by mass to 80% by mass, more preferably in a range of 30% by mass to 75% by mass, and still more preferably in a range of 30% by mass to 70% by mass with respect to the total mass of the acrylic resin.

It is preferable that the constitutional units derived from other monomers are not constitutional units derived from hydrophobic monomers from the viewpoint of maintaining the hydrophilicity of the acrylic resin particles. The constitutional units derived from other monomers are preferably constitutional units derived from monomers selected from methyl methacrylate, ethyl methacrylate, and ethyl acrylate, more preferably constitutional units derived from at least one of methyl methacrylate or methacrylic acid, and still more preferably constitutional units derived from methyl methacrylate.

Hereinafter, specific examples of the acrylic resin related to the resin a will be described. However, the present disclosure is not limited to the following specific examples. Further, the subscript in each constitutional unit represents the compositional ratio (% by mass) on a mass basis.

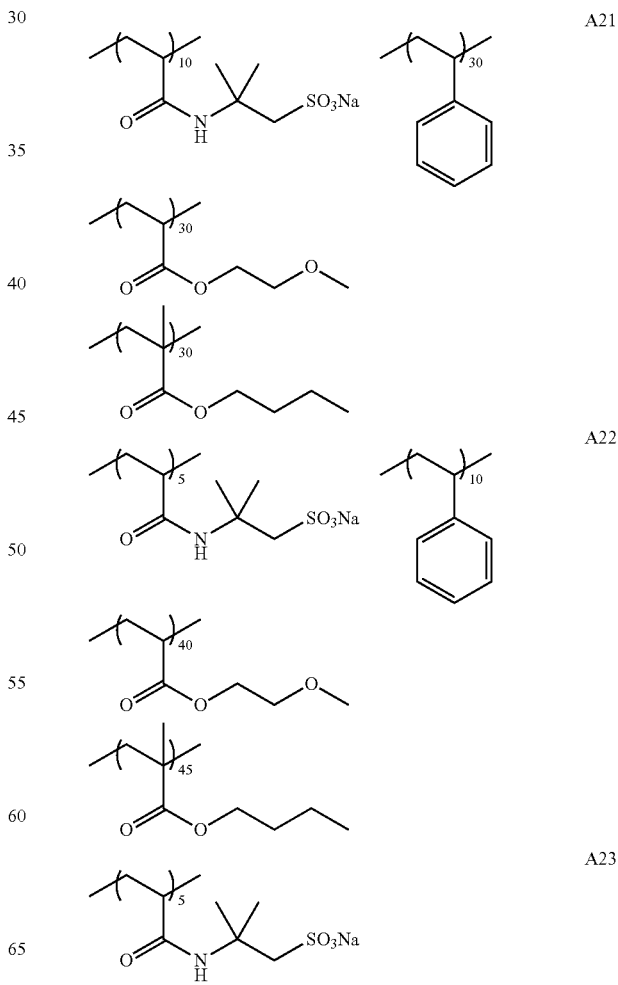

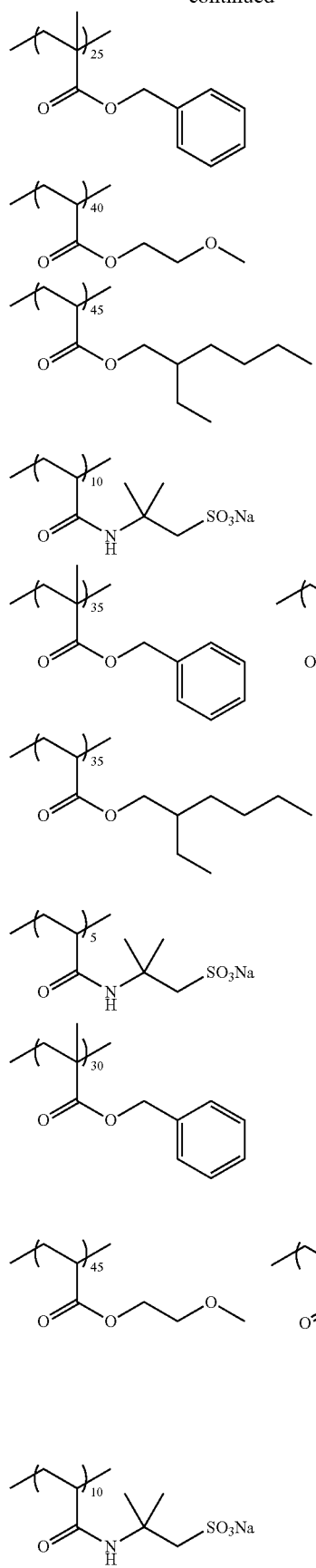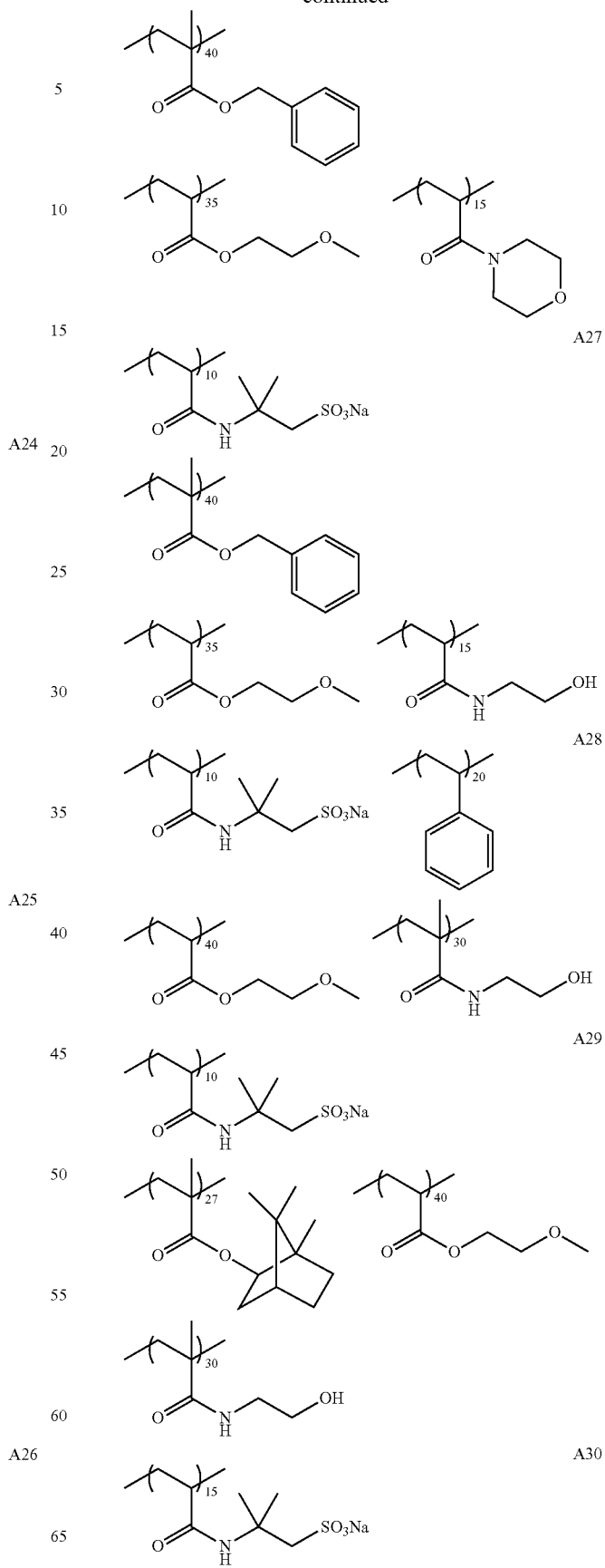

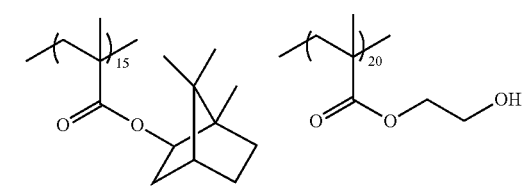
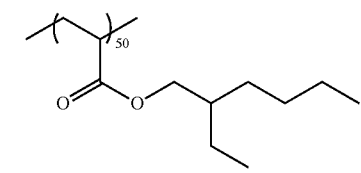
A31
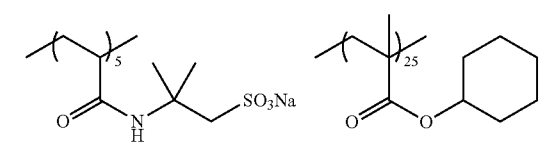
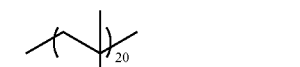
A32
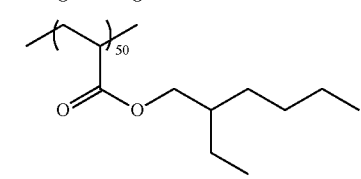
A1
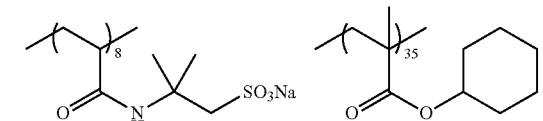
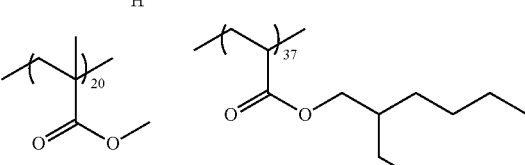
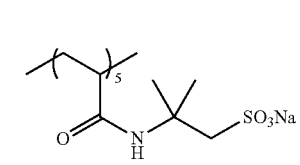
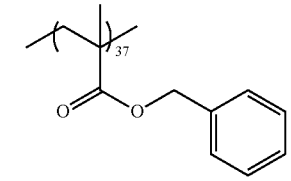
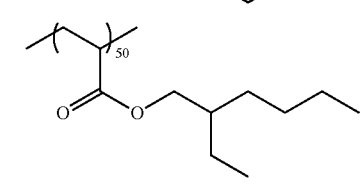
A2
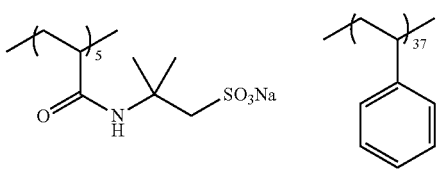
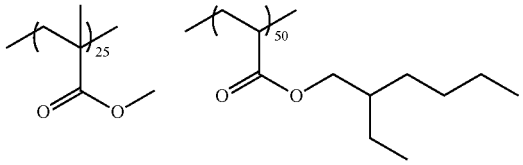
A3
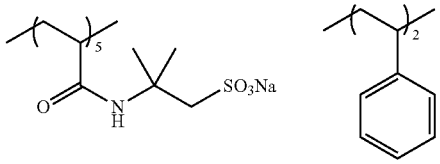
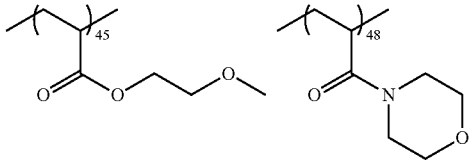
A4
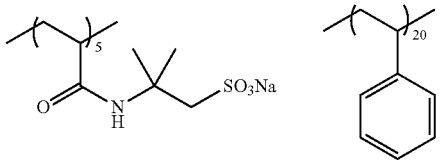
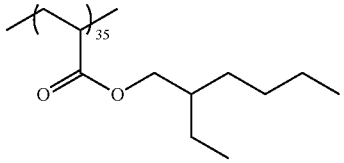
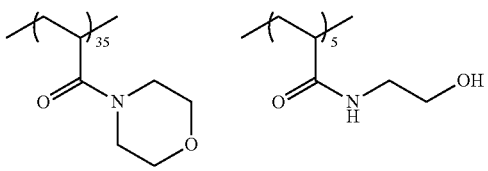
A5
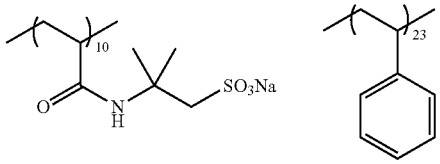
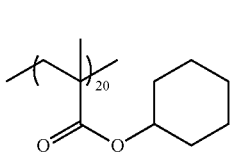

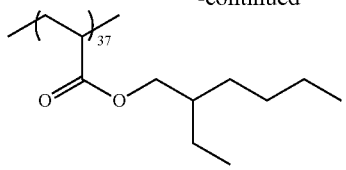

(Ester Resin)

An ester resin can be used as the resin a in the pretreatment liquid.

—Ester Resin Containing Sulfonic Acid Group—

As the ester resin, an ester resin containing a sulfonic acid group is preferable from the viewpoint of excellent liquid storage stability of the prepared pretreatment liquid. From the viewpoint of further improving the adhesiveness of an ink containing a colorant and water to an image, an ester resin containing a sulfonic acid group is preferable, and an ester resin containing a sulfonic acid group and an amide group is more preferable. Examples of the ester resin containing a sulfonic acid group and an amide group include an ester amide copolymer.

Here, the sulfonic acid group of the ester resin is represented by a $SO_3^-Z^+$ group. In the pretreatment liquid, $Z^+$ in the $SO_3^-Z^+$ group represents a counter cation which may be bonded to or dissociated from $SO_3^-$.

As the ester resin containing a sulfonic acid group, a resin synthesized using at least one of a polyvalent carboxylic acid compound or a polyhydric alcohol compound which contains a sulfonic acid group or a resin obtained by introducing a sulfonic acid group to the synthesized ester resin may be used.

Examples of the polyvalent carboxylic acid compound containing a sulfonic acid group used for synthesis of the ester resin include dimethyl sodium 5-sulfoisophthalate and sodium 2-sulfoterephthalate. Among these, from the viewpoint of simplicity of the method of synthesizing the polymer, dimethyl sodium 5-sulfoisophthalate is preferably used.

Meanwhile, examples of the polyhydric alcohol compound containing a sulfonic acid group include sodium benzene 1,4-dihydroxy-2-sulfonate, sodium benzene 1,3-dihydroxymethyl-5-sulfonate, and sodium 2-sulfo-1,4-butanediol.

Constitutional Unit Represented by Formula (I) or Formula (II)

In the present disclosure, the ester resin containing a sulfonic acid group has preferably a constitutional unit represented by Formula (I) or (II) and more preferably a constitutional unit represented by Formula (I).

The constitutional unit represented by Formula (II) can be introduced into the ester resin using a polyvalent carboxylic acid compound such as sulfosuccinic acid.

The constitutional unit represented by Formula (I) can be introduced into the ester resin using a polyvalent carboxylic acid compound such as dimethyl sodium 5-sulfoisophthalate, sodium 5-sulfoisophthalate, dimethyl sodium 2-sulfoterephthalate, or sodium 2-sulfoterephthalate as a monomer component used for obtaining the ester resin containing a sulfonic acid group.

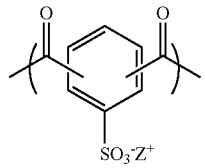

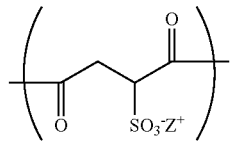

In Formula (I), Z represents a counter cation which may be bonded to or dissociated from $SO_3^-$.

In Formula (I), it is preferable that $Z^+$ represents $Na^+$, $K^+$, or $H^+$.

The content of the constitutional unit represented by Formula (I) or (II) in the ester resin containing a sulfonic acid group used in the present disclosure is preferably in a range of 1% by mole to 45% by mole, more preferably in a range of 1% by mole to 25% by mole, and still more preferably in a range of 1% by mole to 15% by mole with respect to the content of all constitutional units in the ester resin containing a sulfonic acid group.

Constitutional Unit Represented by Formula (i)

It is preferable that the ester resin containing a sulfonic acid group used in the present disclosure further has a constitutional unit represented by Formula (i).

In a case where the ester resin containing a sulfonic acid group further has a constitutional unit represented by Formula (i), the HSP distance can be easily adjusted so that the adhesiveness of the ink containing a colorant and water to the image can be improved.

The constitutional unit represented by Formula (i) can be introduced into the ester resin containing a sulfonic acid group using a polyvalent carboxylic acid compound such as phthalic acid, isophthalic acid, terephthalic acid, or an esterified product thereof as a monomer component used for obtaining the ester resin containing a sulfonic acid group.

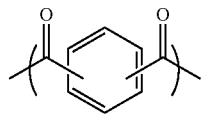

The content of the constitutional unit represented by Formula (i) in the ester resin containing a sulfonic acid group used in the present disclosure is preferably in a range of 5% by mole to 49% by mole, more preferably in a range of 25% by mole to 49% by mole, and still more preferably in a range of 35% by mole to 49% by mole with respect to the content of all constitutional units in the ester resin containing a sulfonic acid group.

Constitutional Unit Represented by Formula (ii)

From the viewpoint of imparting an emulsion and dispersion effect with high reactivity and ease of synthesis, it is preferable that the ester resin containing a sulfonic acid group has a constitutional unit represented by Formula (ii).

The constitutional unit represented by Formula (ii) can be introduced into the ester resin containing a sulfonic acid group using a diol such as diethylene glycol or ethylene glycol as a monomer component used for obtaining the ester resin containing a sulfonic acid group.

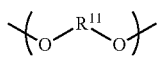
(ii)

In Formula (ii), $R^{11}$ represents a divalent linking group.

As the divalent linking group, an alkylene group, an arylene group, an alkylene group having one or more ether bonds in the structure, or a group obtained by combining these is preferable.

In the present disclosure, unless otherwise specified, the "alkylene group" may be linear or branched, and some or all carbon atoms constituting the alkylene group are cyclic may be formed to have a cyclic structure.

As the alkylene group, an alkylene group having 2 to 20 carbon atoms is preferable, an alkylene group having 2 to 10 carbon atoms is more preferable, and an alkylene group having 2 to 4 carbon atoms is still more preferable.

As the arylene group, an arylene group having 6 to 20 carbon atoms is preferable, an arylene group having 6 to 10 carbon atoms is more preferable, and a phenylene group is still more preferable.

Examples of the constitutional unit represented by Formula (ii) include constitutional units derived from diols, for example, aliphatic diols such as ethylene glycol, diethylene glycol, triethylene glycol, propylene glycol, butanediol, hexanediol, and neopentyl glycol; alicyclic diols such as cyclohexanediol and hydrogenated bisphenol A; and aromatic diols such as an ethylene oxide adduct of bisphenol A and a propylene oxide adduct of bisphenol A.

The ester resin containing a sulfonic acid group may have only one or two or more kinds of the constitutional units represented by Formula (ii).

In a case where the ester resin containing a sulfonic acid group has the constitutional unit represented by Formula (ii), the content of the constitutional unit represented by Formula (ii) is preferably in a range of 1% by mole to 50% by mole, more preferably in a range of 10% by mole to 40% by mole, and still more preferably in a range of 10% by mole to 35% by mole with respect to the content of all constitutional units in the ester resin containing a sulfonic acid group.

Constitutional Unit Represented by Formula (iii)

From the viewpoints of improving the adhesiveness of the ink containing a colorant and water to the image and improving the rub resistance of the image, it is preferable that the ester resin containing a sulfonic acid group has a constitutional unit represented by Formula (iii).

The constitutional unit represented by Formula (iii) can be introduced into the ester resin using, for example, 1,4-cyclohexanedimethanol as a monomer component used for obtaining the ester resin containing a sulfonic acid group.

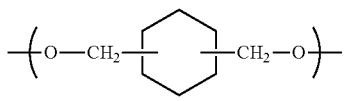
(iii)

In Formula (iii), two bonding positions of the two —CH₂—O— are not particularly limited, but it is preferable that the bonding positions are respectively bonded to the carbon atoms at the 1- and 4-positions or the carbon atoms at the 1- and 2-positions in the cyclohexane ring structure and more preferable that the bonding positions are respectively bonded to the carbon atoms at the 1- and 4-positions in the cyclohexane ring structure.

In a case where the ester resin containing a sulfonic acid group has a constitutional unit represented by Formula (iii), the content of the constitutional unit represented by Formula (iii) is preferably in a range of 1% by mole to 50% by mole, more preferably in a range of 10% by mole to 40% by mole, and still more preferably in a range of 20% by mole to 40% by mole with respect to the content of all constitutional units in the ester resin containing a sulfonic acid group.

Other Constitutional Units

The ester resin containing a sulfonic acid group may have constitutional units other than those described above.

Examples of other constitutional units include constitutional units derived from, for example, trivalent or higher valent polyvalent carboxylic acids such as trimellitic acid and an acid anhydride thereof, trivalent or higher valent polyhydric alcohol such as glycerin, trimethylolpropane, or pentaerythritol; aliphatic carboxylic acid such as naphthalenedicarboxylic acid, maleic anhydride, fumaric acid, succinic acid, alkenyl succinic anhydride, or adipic acid; and alicyclic dicarboxylic acid such as cyclohexanedicarboxylic acid.

In a case where the ester resin containing a sulfonic acid group contains other constitutional units, the content of other constitutional units is preferably greater than 0% by mole and 49% by mole or less and more preferably greater than 0% by mole and 20% by mole or less with respect to the content of all constitutional units in the ester resin containing a sulfonic acid group.

[Physical Properties of Ester Resin]

From the viewpoints of suppressing peeling of the image recorded using an ink containing a colorant and water and easiness of taking out in a taking-out step in a method of producing a polymer, the weight-average molecular weight of the ester resin used in the present disclosure is preferably in a range of 10000 to 500000, more preferably in a range of 20000 to 250000, and still more preferably in a range of 30000 to 200000. Further, the weight-average molecular weight is a value measured by the above-described method.

Specific Examples

Hereinafter, specific examples of the ester resin will be described, but the present invention is not limited thereto.

In addition, in the following specific examples, the subscript outside the parentheses of each constitutional unit indicates the molar content.

In the following specific examples, —SO₃Na may be —SO₃K or —SO₃H, or may be —SO₃⁻ after dissociation.

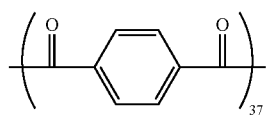
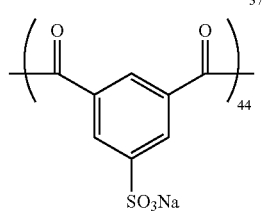

E21

-continued

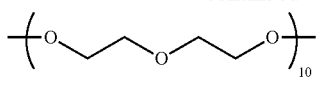
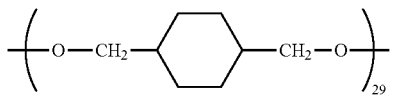
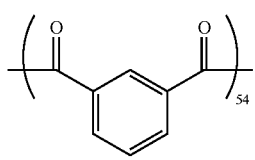
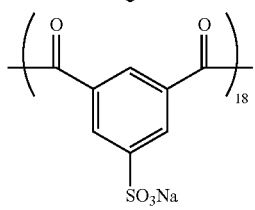
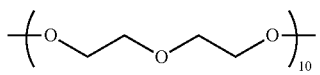
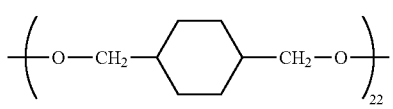
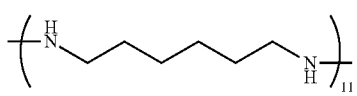
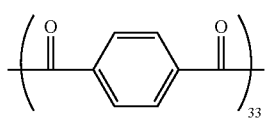
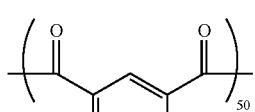
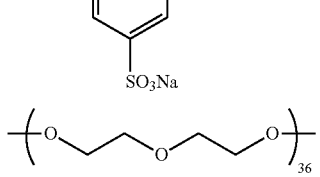
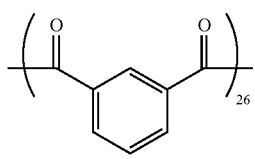
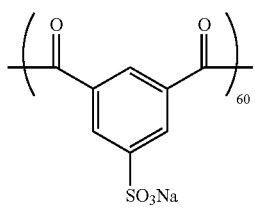

E22

-continued

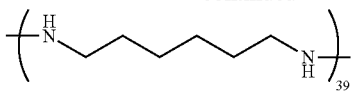

E1

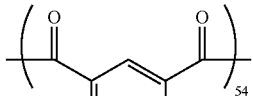
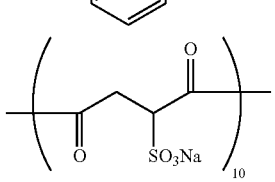
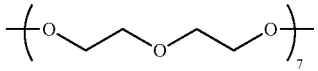
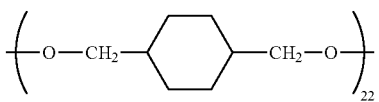
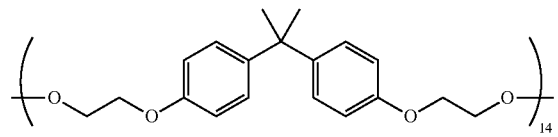

(Urethane Resin)

The urethane resin of the present disclosure is a polyurethane resin obtained by polymerizing a polyol and a polyisocyanate, and at least a compound represented by Formula (1) can be used as the polyol.

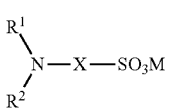

(1)

E23

E24

In Formula (1), X represents a divalent linking group, $R^1$ and $R^2$ each independently represent an alkyl group having 3 or more carbon atoms which contains at least one hydroxyl group or an aralkyl group having 8 or more carbon atoms which contains at least one hydroxyl group, and the alkyl group and the aralkyl group may have a substituent, and M represents a hydrogen atom or a cation.

In the present disclosure, the "polyol" indicates a compound containing two or more hydroxyl groups in a molecule or a compound group. Further, the polyol may be used as one kind of compound or in combination of two or more kinds of compounds at an optional ratio.

Further, the urethane resin of the present disclosure is obtained by polymerizing a polyol and a polyisocyanate, and it is preferable to use a short chain diol having a weight-average molecular weight of 500 or less and other polyols as the polyol and more preferable to use a compound represented by Formula (1) as the short chain diol. It is more preferable to use a compound represented by Formula (2) and/or Formula (3).

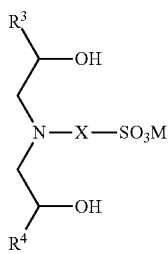

(2)

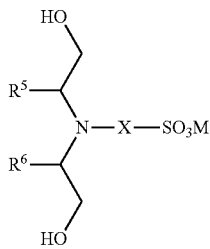

(3)

In Formulae (2) and (3), X represents a divalent linking group, $R^3$, $R^4$, $R^5$, and $R^6$ each independently represent an alkyl group having 2 to 20 carbon atoms, an aryl group having 6 to 20 carbon atoms, an aralkyl group having 7 to 20 carbon atoms, an alkoxyalkyl group having 2 to 20 carbon atoms, or an aryloxyalkyl group having 7 to 20 carbon atoms, and M represents a hydrogen atom or a cation.

—Other Polyols—

It is preferable to use a compound represented by Formula (1) and another polyol in combination.

The polyol to be used in combination is not particularly limited, and known polyols such as polyester polyol, polyether polyol, polyether ester polyol, polycarbonate polyol, polyolefin polyol, and dimer diol may be used as necessary.

Among these, polyester polyol and polyether polyol are preferable.

The polyester polyol is obtained by polycondensing a polycarboxylic acid (polybasic acid) and a polyol and preferably obtained by reacting a dicarboxylic acid with a diol. The dicarboxylic acid component that can be used for the polyester polyol is not particularly limited, but adipic acid, azelaic acid, phthalic acid, Na sulfoisophthalic acid, and the like are preferable. As the diol, those having a branched side chain such as 2,2-dimethyl-1,3-propanediol, 2-ethyl-2-butyl-1,3-propanediol, and 3-methyl-1,5-pentanediol are preferable.

It is preferable that the polyether polyol has a cyclic structure such as a polypropylene oxide adduct of bisphenol A or a polyethylene oxide adduct of bisphenol A.

In the present disclosure, specific examples and preferred embodiments of a chain extender are as described in paragraphs 0058 to 0065 of JP2009-096798A.

—Polyisocyanate—

In the present disclosure, a diisocyanate can be suitably used as a polyisocyanate.

The diisocyanate is not particularly limited, and known ones can be used. Specific preferred examples thereof include tolylene diisocyanate (TDI), diphenylmethane diisocyanate (MDI), p-phenylene diisocyanate, o-phenylene diisocyanate, m-phenylene diisocyanate, xylylene diisocyanate, hydrogenated xylylene diisocyanate, and isophorone diisocyanate.

The weight-average molecular weight of the urethane resin of the present disclosure is preferably in a range of 10000 to 200000, more preferably in a range of 40000 to 100000, and still more preferably in a range of 50000 to 90000. It is preferable that the weight-average molecular weight of the urethane resin of the present disclosure is 10000 or greater from the viewpoint of obtaining excellent storability. Further, it is preferable that the weight-average molecular weight thereof is 200000 or less from the viewpoint of obtaining excellent dispersibility.

Further, the weight-average molecular weight can be measured by the same measuring method as described above.

In the present disclosure, it is preferable that the urethane resin has a unit derived from a compound containing a sulfonic acid group. The compound containing a sulfonic acid group and preferred embodiments of the compound containing a sulfonic acid group are as described in paragraphs 0031 to 0038 of JP2011-144345A.

U21

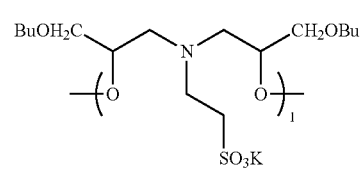

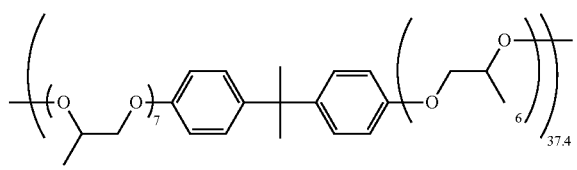

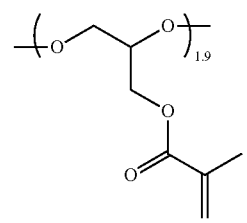

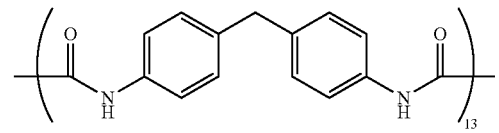

U22

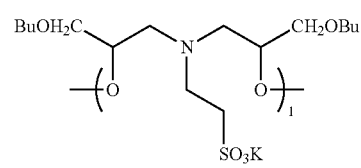

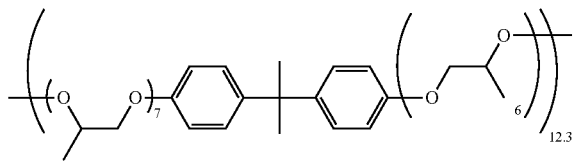

-continued

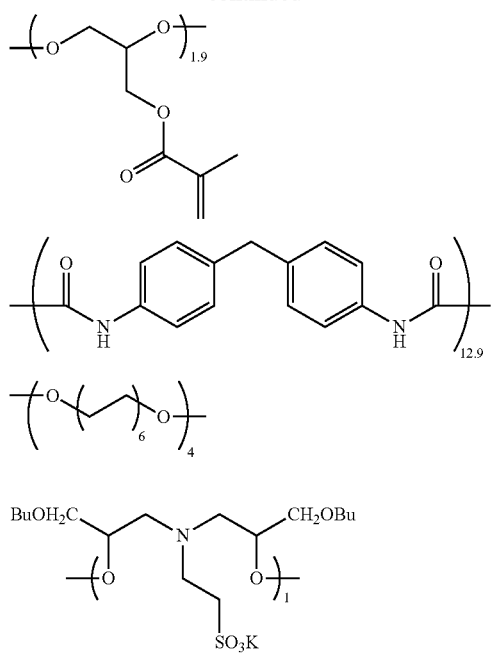

U1

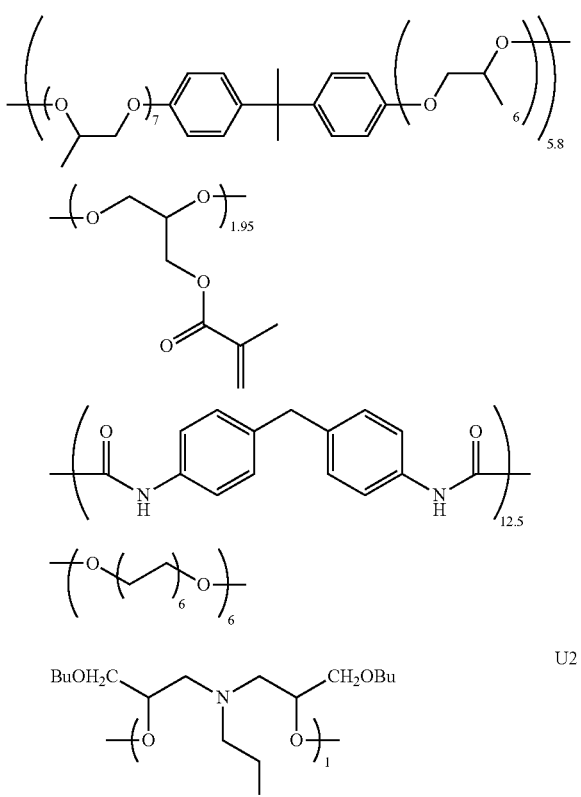

U2

-continued

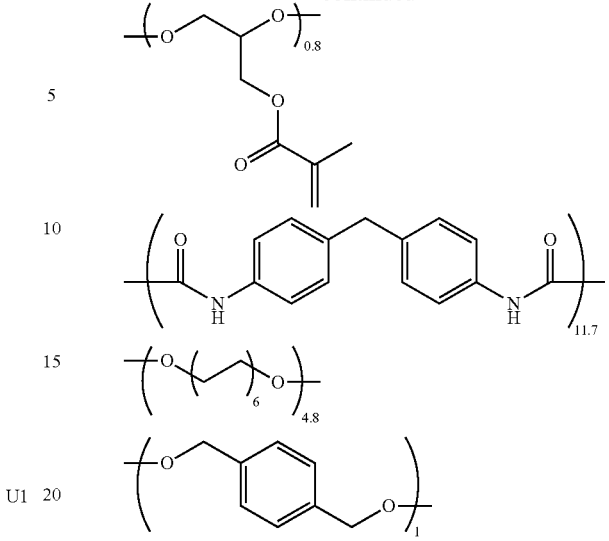

The resin a may be used in the form of particles. In that case, the particle diameter can be set to be in the same range as that of the particles of the resin b.

(Particles of Resin b)

The pretreatment liquid according to the embodiment of the present disclosure contains particles of resin b having a glass transition temperature of 25° C. or higher. In this manner, it possible to avoid deterioration of the adhesiveness, the blocking resistance, and the aggregating agent blocking resistance due to degraded drying properties, which is a defect in a case where a large amount of the resin having a relatively low glass transition temperature is contained in the pretreatment liquid.

The resin b is present in the form of particles. In this manner, the drying properties are satisfactory, and the adhesiveness, the blocking resistance, and the aggregating agent blocking resistance can be improved.

The glass transition temperature of the resin b is 25° C. or higher. In this manner, the resin b does not undergo glass transition at room temperature (25° C.), and the drying properties of the pretreatment liquid can be maintained to be satisfactory.

From the above-described viewpoint, the glass transition temperature of the resin b is preferably in a range of 30° C. to 90° C., more preferably in a range of 35° C. to 80° C., and still more preferably in a range of 40° C. to 70° C.

Further, the method of measuring the glass transition temperature is as described above. Further, in the present disclosure, the glass transition temperature in a case where the pretreatment liquid contains a plurality of resins b is a value calculated as an average value of all resins included as the resins b by integrating the glass transition temperature of each resin at a mass ratio of each resin, and this value is set as the glass transition temperature of the resin b.

From the viewpoint of the blocking resistance, the aggregating agent blocking resistance, and the adhesiveness, it is preferable that the glass transition temperature of the resin b is 30° C. or higher and the glass transition temperature of the resin a is 20° C. or lower. In a case where the glass transition temperature of the resin b is 30° C. or higher, the drying properties are more satisfactory. Further, in a case where the glass transition temperature of the resin a is 20° C. or lower, the adhesiveness is more satisfactory.

From the above-described viewpoint, it is more preferable that the glass transition temperature of the resin b is 30° C. or higher and the glass transition temperature of the resin a is 20° C. or lower and still more preferable that the glass transition temperature of the resin b is 40° C. or higher and the glass transition temperature of the resin a is 10° C. or lower.

From the viewpoints of the blocking resistance, the aggregating agent blocking resistance, and the adhesiveness, a difference between the glass transition temperature of resin b and the glass transition temperature of resin a is preferably 15° C. or higher.

The difference between the glass transition temperature of the resin b and the glass transition temperature of the resin a is more preferably 20° C. or higher and still more preferably 30° C. or higher.

From the same viewpoint as described above, the difference between the glass transition temperature of the resin b and the glass transition temperature of the resin a is preferably 90° C. or lower.

[HSP Distance]

The HSP distance between the resin b and the aqueous medium is preferably in a range of 33 MPa$^{1/2}$ to 41 MPa$^{1/2}$. In a case where the HSP distance is 33 MPa$^{1/2}$ or greater, it is possible to avoid deterioration of the drying properties and degradation of the blocking resistance. In a case where the HSP distance is 41 MPa$^{1/2}$ or less, it is possible to prevent degradation of the fusing and welding properties between particles and degradation of the adhesiveness.

The HSP distance between the resin b and the aqueous medium is more preferably in a range of 35 MPa$^{1/2}$ to 40 MPa$^{1/2}$, still more preferably in a range of 35 MPa$^{1/2}$ to 39.6 MPa$^{1/2}$ and particularly preferably in a range of 37 MPa$^{1/2}$ to 39 MPa$^{1/2}$.

The method of measuring the HSP distance is as described above.

As the resin b, the same kind of resin as the resin a except that Tg is different can be used.

Specific examples of the resin b include an acrylic resin, an ester resin, and a urethane resin.

First, examples of the acrylic resin include the following exemplified compounds, but the present disclosure is not limited thereto.

A41
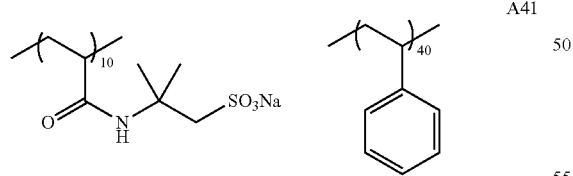

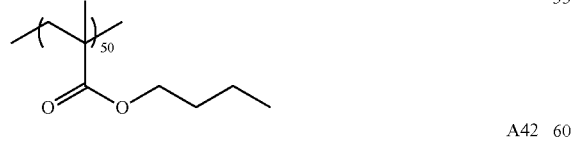

A42
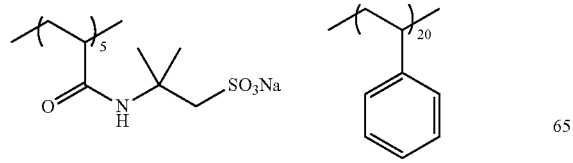

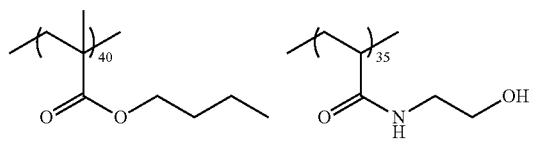

A43
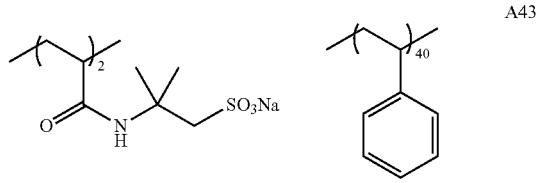

A44
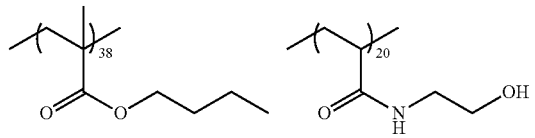

A45
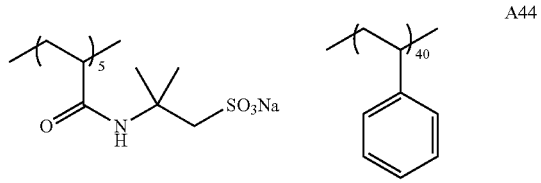

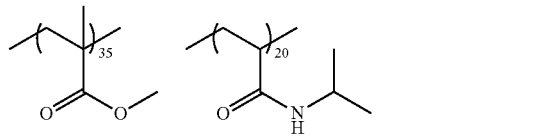

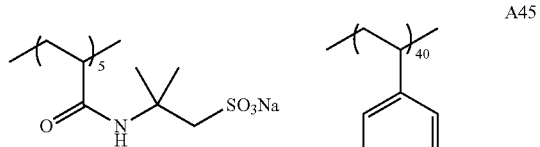

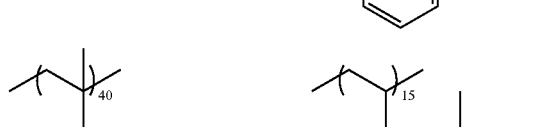

A46
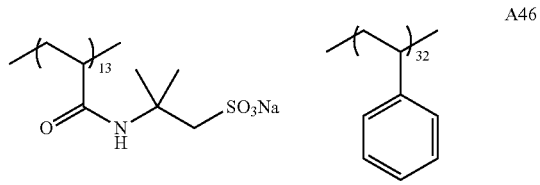

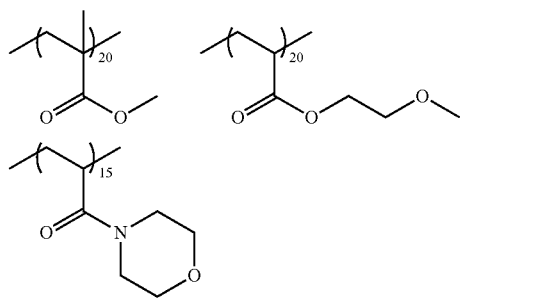

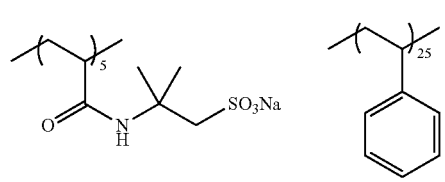
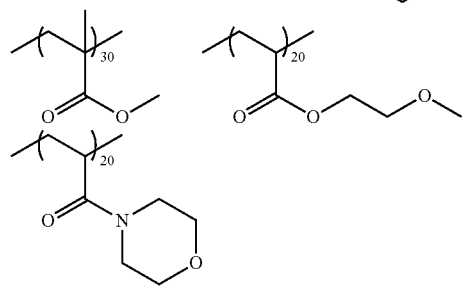
A47
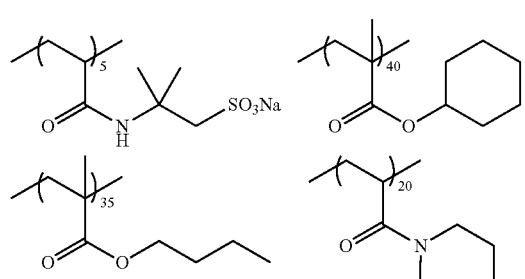
A48
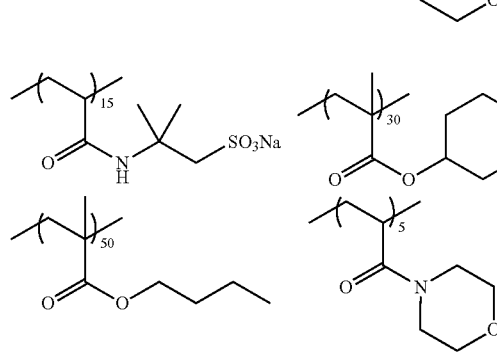
A49
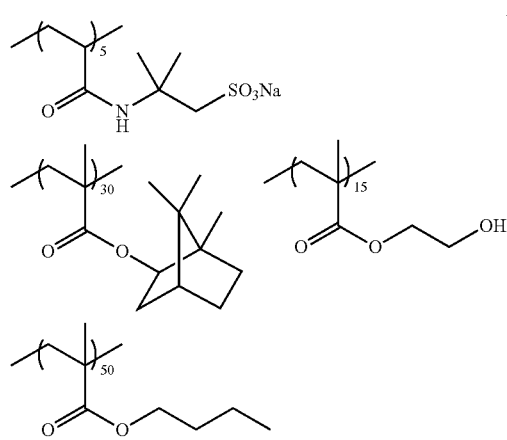
A50
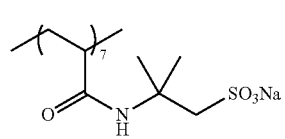
A51
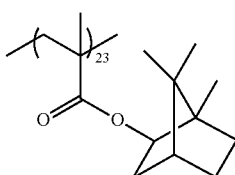
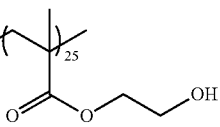
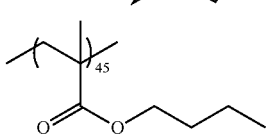
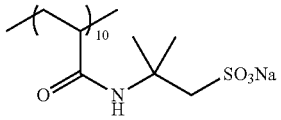
A52
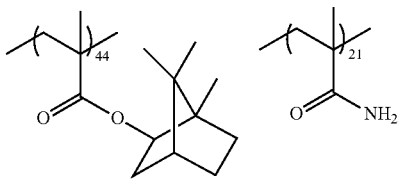
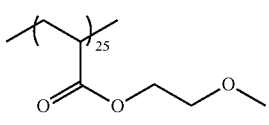
A6
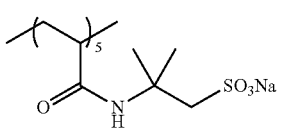
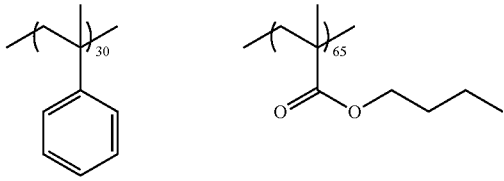
A7
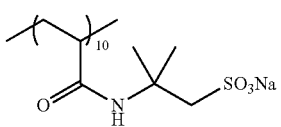
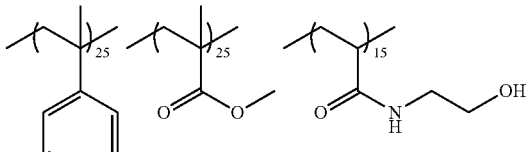
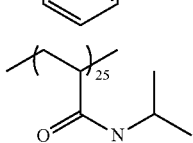
A8
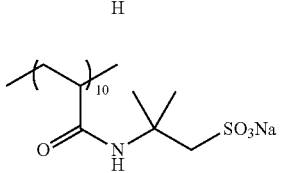

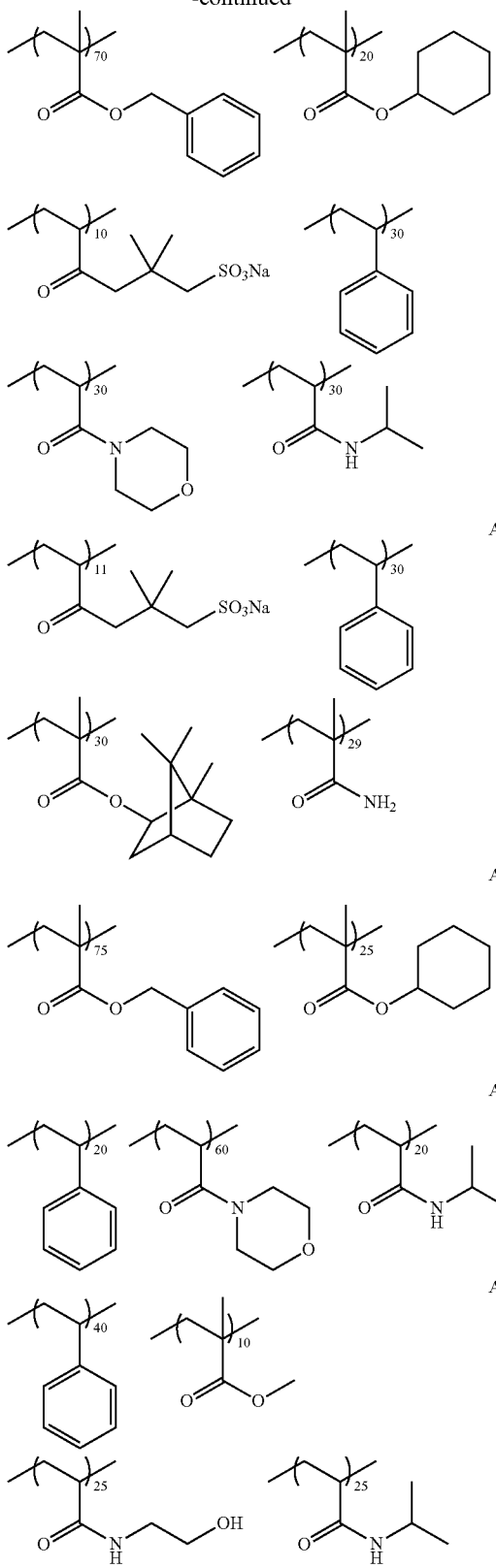
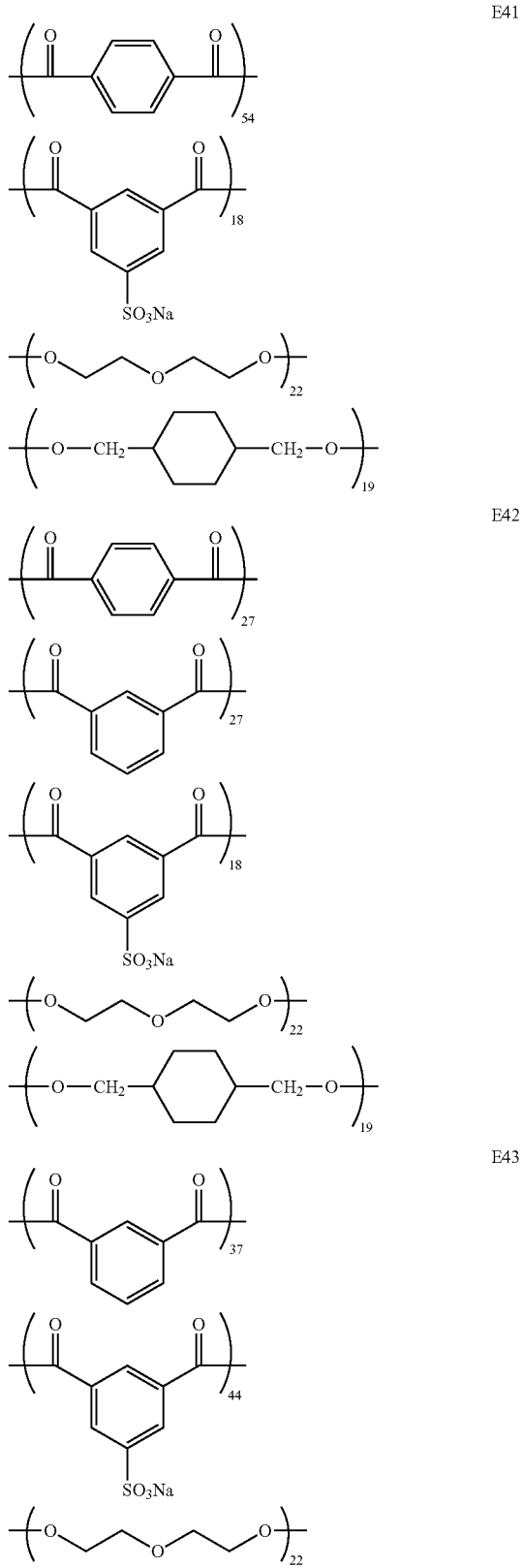
Examples of the ester resin include the following exemplified compounds, but the present disclosure is not limited thereto.
In the present disclosure, a commercially available product may be used as the acrylic resin, and examples thereof include EM57DOC (manufactured by Daicel Finechem Ltd.).

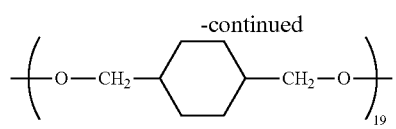

E44

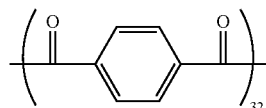

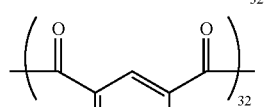

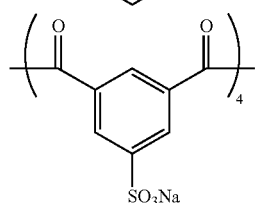

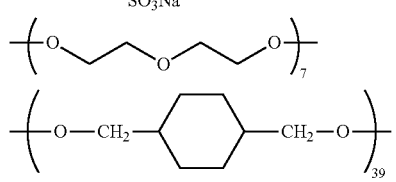

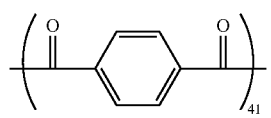

E2

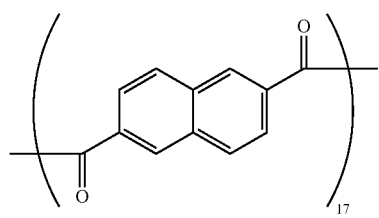

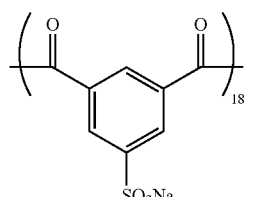

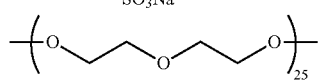

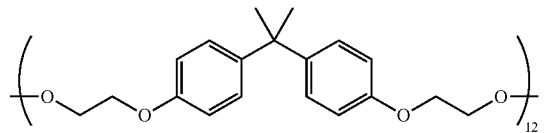

In the present disclosure, a commercially available product may be used as the ester resin. Examples of the commercially available product of the aqueous dispersion liquid of polyester resin particles include Eastek 1100 and Eastek 1200 (both manufactured by Eastman Chemical Company), PLASCOAT RZ570, PLASCOAT Z687, PLASCOAT Z565, and PLASCOAT RZ690 (all manufactured by Goo Chemical Co., Ltd.), and VYLONAL (registered trademark) MD1200 (manufactured by Toyobo Co., Ltd.).

In the present disclosure, in a case of preparing a pretreatment liquid that contains composite particles, a commercially available product of an aqueous dispersion liquid of composite particles of an acrylic resin and an ester resin may be used as a raw material.

Examples of the commercially available product of the aqueous dispersion liquid of composite particles of an acrylic resin and an ester resin include PESRESIN A615GE and PESRESIN A645GH (manufactured by Takamatsu Oil & Fat Co., Ltd.).

Examples of the urethane resin include the following exemplified compounds, but the present disclosure is not limited thereto.

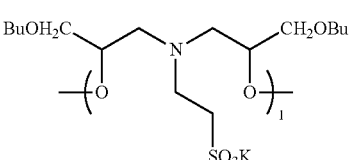 U41

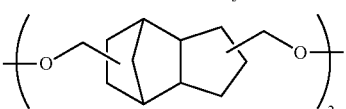

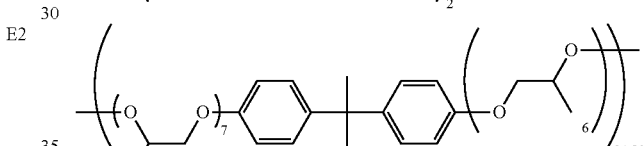

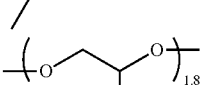

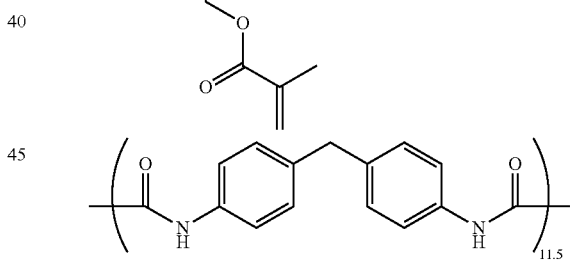

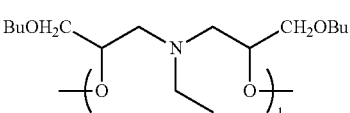 U42

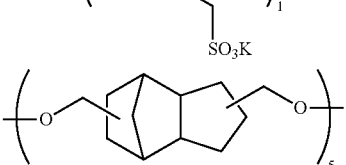

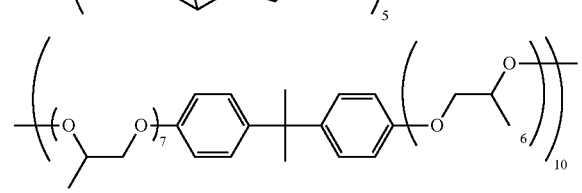

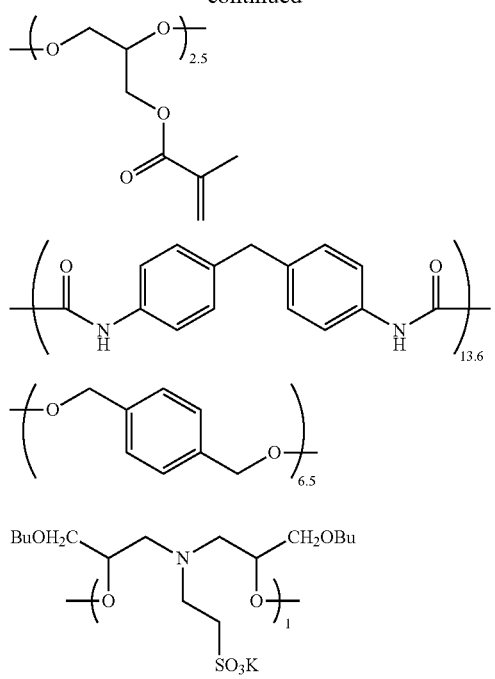

U43

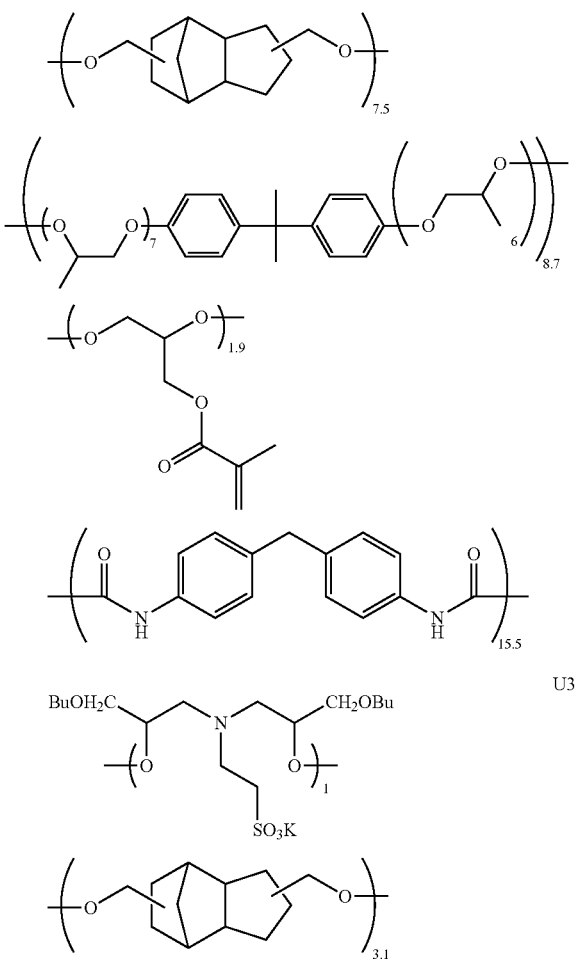

U3

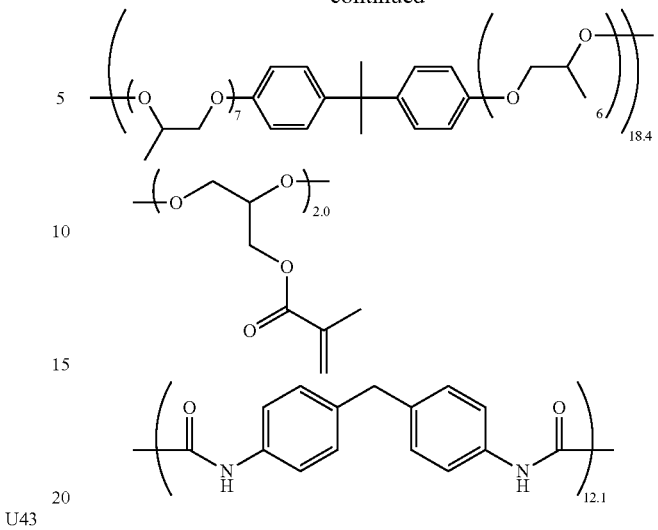

The HSP distance between the resin b and the resin a is preferably in a range of 0 MPa$^{1/2}$ to 7 MPa$^{1/2}$.

In a case where the HSP distance between the resin b and the resin a is in the above-described range, the adhesiveness and compatibility between the resin b and the resin a can be maintained to be satisfactory, and the blocking resistance and the aggregating agent blocking resistance can be improved.

From the same viewpoint as described above, the HSP distance between the resin b and the resin a is more preferably in a range of 0 MPa$^{1/2}$ to 5 MPa$^{1/2}$ and still more preferably in a range of 0 MPa$^{1/2}$ to 2 MPa$^{1/2}$.

As the resin b, in a case where the affinity for the solvent is small (for example, in a case where the hydrogen bonding property of the resin is small), the drying properties are satisfactory, and the blocking resistance, the aggregating agent blocking resistance, and the adhesiveness are improved. Further, from the viewpoint of the adhesiveness, it is desirable that the structure is similar to that of the resin a. Therefore, as the resin b, an acrylic resin, an ester resin, or a urethane resin is preferable, an acrylic resin or an ester resin is more preferable, and an acrylic resin is still more preferable.

(Average Primary Particle Diameter)

From the viewpoint of the fusing and welding properties of the resin particles, the average primary particle diameter of the particles of the resin b is preferably in a range of 1 nm to 400 nm, more preferably in a range of 5 nm to 300 nm, and still more preferably in a range of 20 nm to 200 nm.

The average primary particle diameter is a value acquired by measuring the volume average particle diameter by a dynamic light scattering method using a nanotrac particle size distribution measuring apparatus UPA-EX150 (manufactured by Nikkiso Co., Ltd.).

[Content]

From the viewpoint of improving the drying properties, the content of the resin b in the pretreatment liquid according to the embodiment of the present disclosure is preferably in a range of 1% by mass to 25% by mass, more preferably in a range of 2% by mass to 20% by mass, and still more preferably in a range of 3% to 15% by mass with respect to the total mass of the pretreatment liquid.

In the present disclosure, the mass ratio of the resin b to the resin a is preferably in a range of 1.5:1 to 100:1. In a case where the mass ratio of the resin b to the resin a is 1.5:1 or greater, since satisfactory drying properties can be realized, the blocking resistance and the adhesiveness can be maintained to be satisfactory. In a case where the mass ratio of the resin b to the resin a is 100:1 or less, the blocking resistance and the adhesiveness can be maintained to be satisfactory.

From the above-described viewpoint, the mass ratio of the resin b to the resin a is more preferably in a range of 3:1 to 20:1.

<Core Shell Particles>

The pretreatment liquid according to the embodiment of the present disclosure may contain core shell particles containing particles of the resin b as a shell and the resin a as a core or core shell particles containing the resin a as a shell and particles of the resin b as a core. The core shell particles containing the resin a as a shell and the particles of the resin b as a core are preferable.

In a case where the pretreatment liquid contains the core shell particles containing the resin a as a shell and the particles of the resin b as a core, the fusing and welding properties as the entirety of the core shell particles can be improved, and thus the adhesiveness can be further improved.

The core shell particle in the present disclosure indicates a particle having a core layer and a shell layer on a surface of the core layer.

(Average Primary Particle Diameter)

In a case where the pretreatment liquid according to the embodiment of the present disclosure contains the core shell particles, the preferable range of the average primary particle diameter of the core shell particles is the same as the preferable range described in section of the average primary particle diameter of the particles of the resin b. Further, the method of measuring the average primary particle diameter of the core shell particles is the same as the method of measuring the average primary particle diameter of the particles of the resin b described above.

In a case where the pretreatment liquid according to the embodiment of the present disclosure contains the core shell particles, from the viewpoint of the adhesiveness, the mass ratio between the resin b and the resin a in the core shell particles is preferably in a range of 1:1 to 100:1, more preferably in a range of 1.5:1 to 20:1, and still more preferably in a range of 3:1 to 20:1.

The method of producing the core shell particles in the present disclosure is not particularly limited, and a known method can be used. For example, the methods described in J. APPL. POLYM. SCI. 2014, DOI: 10. 1002/APP. 39991, and the like can be used.

[Aqueous Medium]

The pretreatment liquid according to the embodiment of the present disclosure contains an aqueous medium.

Examples of the aqueous medium in the present disclosure include water, a water-soluble organic solvent, and a mixed solvent of water and a water-soluble organic solvent.

The content of the aqueous medium is preferably in a range of 50% by mass to 95% by mass, more preferably in a range of 60% by mass to 90% by mass, and still more preferably in a range of 70% by mass to 85% by mass with respect to the total mass of the pretreatment liquid.

Water is preferable as the aqueous medium.

Examples of water include ion exchange water and distilled water.

Examples of the water-soluble organic solvent include glycols such as glycerin, 1,2,6-hexanetriol, trimethylolpropane, ethylene glycol, propylene glycol, diethylene glycol, triethylene glycol, tetraethylene glycol, pentaethylene glycol, and dipropylene glycol; polyhydric alcohols, for example, alkanediol such as 2-butene-1,4-diol, 2-ethyl-1,3-hexanediol, 2-methyl-2,4-pentanediol, 1,2-octanediol, 1,2-hexanediol, 1,2-pentanediol, or 4-methyl-1,2-pentanediol; and saccharides, sugar alcohols, hyaluronic acids, alkyl alcohols having 1 to 4 carbon atoms, glycol ethers, 2-pyrrolidone, and N-methyl-2-pyrrolidone described in paragraph 0116 of JP2011-042150A.

Among these, from the viewpoint of suppressing transfer of the components contained in the pretreatment liquid, polyalkylene glycol or a derivative thereof is preferable; and at least one selected from diethylene glycol monoalkyl ether, triethylene glycol monoalkyl ether, dipropylene glycol, tripropylene glycol monoalkyl ether, polyoxypropylene glyceryl ether, and polyoxyethylene polyoxypropylene glycol is more preferable.

From the viewpoint of the coating properties, the content of the water-soluble solvent in the pretreatment liquid is preferably in a range of 3% by mass to 20% by mass and more preferably in a range of 5% by mass to 15% by mass with respect to the total content of the pretreatment liquid.

[Aggregating Agent]

It is preferable that the pretreatment liquid according to the embodiment of the present disclosure further contains at least one aggregating agent selected from the group consisting of a polyvalent metal salt, an organic acid, a metal complex, and a water-soluble cationic polymer.

In a case where the pretreatment liquid contains an aggregating agent, the aggregating agent is combined with the ink containing a colorant and water, and an image having an excellent image quality is easily obtained.

Further, it is considered that the leakage of the aggregating agent in the image recorded material to be obtained is suppressed and the transfer of components contained in the pretreatment liquid such as the aggregating agent suppressed by combining the aggregating agent with the resin a and the resin b used in the present disclosure. The mechanism by which the transfer is suppressed is not clear, but it is assumed that the transfer is suppressed because the affinity of the resin a and the resin b for the aggregating agent is high and particularly the transfer of the aggregating agent is suppressed.

In the pretreatment liquid according to the embodiment of the present disclosure, from the viewpoints of improving the image quality of an image recorded material to be obtained and suppressing the transfer of the components contained in the pretreatment liquid, the mass ratio between a content A of the resin a and the resin b to a content B of the aggregating agent (content A of resin a and resin b:content B of aggregating agent) in the pretreatment liquid is preferably in a range of 10:1 to 1:1, more preferably in a range of 8:1 to 1:1, and still more preferably in a range of 5:1 to 1:1.

In the present disclosure, the amount of the solid content indicates the amount of residues obtained by removing solvents such as water and an organic solvent from the pretreatment liquid.

From the viewpoints of the rub resistance and the image quality of the image recorded material to be obtained, it is preferable that the aggregating agent used in the present disclosure contains an organic acid and more preferable that the aggregating agent contains a dicarboxylic acid as the organic acid.

Hereinafter, the details of the aggregating agent used in the present disclosure will be described.

—Organic Acid—

As the organic acid used in the present disclosure, an organic compound containing an acidic group is exemplified.

Examples of the acidic group include a phosphoric acid group, a phosphonic acid group, a phosphinic acid group, a sulfuric acid group, a sulfonic acid group, a sulfinic acid group, and a carboxy group. From the viewpoint of the aggregation rate of the ink, a phosphoric acid group or a carboxy group is preferable, and a carboxy group is more preferable as the acidic group.

Further, it is preferable that at least a part of the acidic group is dissociated in the pretreatment liquid.

Preferred examples of the organic compound containing a carboxy group suitable as the organic acid include polyacrylic acid, acetic acid, glycolic acid, malonic acid, malic acid (preferably DL-malic acid), maleic acid, ascorbic acid, succinic acid, glutaric acid, fumaric acid, citric acid, tartaric acid, phthalic acid, 4-methylphthalic acid, lactic acid, sulfonic acid, orthophosphoric acid, pyrrolidone carboxylic acid, pyrone carboxylic acid, pyrrole carboxylic acid, furan carboxylic acid, pyridine carboxylic acid, coumarinic acid, thiophene carboxylic acid, nicotinic acid, derivatives of these compounds, and salts thereof. These compounds may be used alone or in combination of two or more kinds thereof.

From the viewpoint of the aggregation rate of the ink, as the organic compound containing a carboxy group, di- or higher valent carboxylic acid (hereinafter, also referred to as polyvalent carboxylic acid) is preferable, and dicarboxylic acid is more preferable.

As the dicarboxylic acid, malonic acid, malic acid, maleic acid, succinic acid, glutaric acid, fumaric acid, tartaric acid, 4-methylphthalic acid, or citric acid is preferable, and malonic acid, malic acid, glutaric acid, tartaric acid, or citric acid is more preferable.

It is preferable that the organic acid has a low pKa (for example, 1.0 to 5.0). In this manner, the surface charge of particles such as polymer particles or the pigment stably dispersed in the ink by a weakly acidic functional group such as a carboxy group is reduced by bringing the ink into contact with an organic acidic compound having a lower pKa to degrade the dispersion stability.

It is preferable that the organic acid contained in the pretreatment liquid has a low pKa and a high solubility in water and is di- or higher valent and more preferable that the organic acid is a di- or trivalent acidic substance which has a high buffer capacity in a pH region having a pKa which is lower than the pKa of the functional group (for example, a carboxy group) that allows the particles to be stably dispersed in the ink.

In a case where an organic acid is used as the aggregating agent, the content of the organic acid is preferably in a range of 1% by mass to 20% by mass, more preferably in a range of 2% by mass to 15% by mass, and still more preferably in a range of 5% by mass to 10% by mass with respect to the total mass of the pretreatment liquid according to the embodiment of the present disclosure.

(Polyvalent Metal Salt)

The polyvalent metal salt used in the present disclosure is formed of a di- or higher polyvalent metal ion and an anion that is bonded to the polyvalent metal ion. Further, it is preferable that the polyvalent metal salt is water-soluble.

Specific examples of the polyvalent metal ion include divalent metal ions such as $Ca^{2+}$, $Cu^{2+}$, $Ni^{2+}$, $Mg^{2+}$, $Zn^{2+}$, and $Ba^{2+}$; and trivalent metal ions such as $Al^{3+}$, $Fe^{3+}$, and $Cr^{3+}$. Examples of the anion include $Cl^-$, $NO_3^-$, $I^-$, $Br^-$, $ClO_3^-$, $SO_4^{2-}$, and a carboxylate ion.

As the polyvalent metal salt, a salt containing $Ca^{2+}$ or $Mg^{2+}$ is preferable from the viewpoint of the image quality of an image recorded material to be obtained.

As the polyvalent metal salt, a salt of a sulfate ion ($SO_4^{2-}$), a nitrate ion ($NO_3^-$), or a carboxylate ion ($RCOO^-$, R represents an alkyl group having 1 or more carbon atoms) is preferable.

Here, it is preferable that the carboxylate ion is derived from a saturated aliphatic monocarboxylic acid having 1 to 6 carbon atoms or a carbocyclic monocarboxylic acid having 7 to 11 carbon atoms. Preferred examples of the saturated aliphatic monocarboxylic acid having 1 to 6 carbon atoms include formic acid, acetic acid, propionic acid, butyric acid, isobutyric acid, valeric acid, isovaleric acid, pivalic acid, and hexanoic acid. Particularly, formic acid and acetic acid are preferable.

In a case where a polyvalent metal salt is used as the aggregating agent, the content of the polyvalent metal salt is preferably in a range of 1% by mass to 40% by mass, more preferably in a range of 2% by mass to 25% by mass, and still more preferably in a range of 5% by mass to 20% by mass with respect to the total mass of the pretreatment liquid according to the embodiment of the present disclosure.

(Metal Complex)

In the present disclosure, the metal complex indicates a compound in which a ligand is coordinated to a metal ion such as a zirconium ion, a titanium ion, or an aluminum ion. Various commercially available metal complexes may be used as the metal complex used in the present disclosure.

Further, various organic ligands and particularly various multidentate ligands that are capable of forming metal chelate catalysts are also commercially available. Accordingly, a metal complex prepared by combining a commercially available organic ligand with a metal may be used as the metal complex used in the present disclosure.

Examples of the metal complex include zirconium tetraacetyl acetonate (for example, "ORGATIX ZC-150", manufactured by Matsumoto Fine Chemical Co., Ltd.), zirconium monoacetyl acetonate (for example, "ORGATIX ZC-540", manufactured by Matsumoto Fine Chemical Co., Ltd.), zirconium bisacetyl acetonate (for example, "ORGATIX ZC-550", manufactured by Matsumoto Fine Chemical Co., Ltd.), zirconium monoethyl acetoacetate (for example, "ORGATIX ZC-560", manufactured by Matsumoto Fine Chemical Co., Ltd.), zirconium acetate (for example, "ORGATIX ZC-115", manufactured by Matsumoto Fine Chemical Co., Ltd.), titanium diisopropoxy bis(acetylacetonate) (for example, "ORGATIX TC-100", manufactured by Matsumoto Fine Chemical Co., Ltd.), titanium tetraacetyl acetonate (for example, "ORGATIX TC-401", manufactured by Matsumoto Fine Chemical Co., Ltd.), titanium dioctyloxy bis(octylene glycolate) (for example, "ORGATIX TC-200", manufactured by Matsumoto Fine Chemical Co., Ltd.), titanium diisopropoxy bis(ethylacetoacetate) (for example, "ORGATIX TC-750", manufactured by Matsumoto Fine Chemical Co., Ltd.), zirconium tetraacetyl acetonate (for example, "ORGATIX ZC-700", manufactured by Matsumoto Fine Chemical Co., Ltd.), zirconium tributoxy monoacetyl acetonate (for example, "ORGATIX ZC-540", manufactured by Matsumoto Fine Chemical Co., Ltd.), zirconium monobutoxy acetyl acetonate bis(ethylacetoacetate) (for example, "ORGATIX ZC-570", manufactured by Matsumoto Fine Chemical Co., Ltd.), zirconium dibutoxy bis(ethylacetoacetate) (for example, "ORGATIX ZC-580", manufactured by Matsumoto Fine Chemical Co., Ltd.), aluminum trisacetyl acetonate (for example, "ORGATIX AL-80", manufactured by Matsumoto Fine Chemical Co., Ltd.), titanium lactate ammonium salt (for example, "ORGATIX TC-300", manufactured by Matsumoto Fine Chemical Co., Ltd.), titanium lactate (for example, "ORGATIX TC-310, 315", manufactured by Matsumoto Fine Chemical Co., Ltd.), titanium triethanol aminate (for example, "ORGATIX TC-400", manufactured by Matsumoto Fine Chemical Co., Ltd.), and ORGATIX ZC-126 (manufactured by Matsumoto Fine Chemical Co., Ltd.).

Among these, titanium lactate ammonium salt (for example, "ORGATIX TC-300", manufactured by Matsumoto Fine Chemical Co., Ltd.), titanium lactate (for example, "ORGATIX TC-310, 315", manufactured by Matsumoto Fine Chemical Co., Ltd.), titanium triethanol aminate (for example, "ORGATIX TC-400", manufactured by Matsumoto Fine Chemical Co., Ltd.), and ORGATIX ZC-126 (manufactured by Matsumoto Fine Chemical Co., Ltd.) are preferable.

—Water-Soluble Cationic Polymer—

Examples of the water-soluble cationic polymer include polyallylamine, polyallylamine derivatives, poly-2-hydroxypropyldimethylammonium chloride, and poly(diallyldimethylammoniumchloride).

The water-soluble cationic polymer can refer to the descriptions in known documents such as JP2011-042150A (particularly, paragraph 0156) and JP2007-098610A (particularly, paragraphs 0096 to 0108) as appropriate.

Examples of commercially available products of the water-soluble cationic polymer include SHALLOL (registered trademark) DC-303P and SHALLOL DC-902P (both manufactured by DKS Co., Ltd.), CATIOMASTER (registered trademark) PD-7 and CATIOMASTER PD-30 (both manufactured by Yokkaichi Chemical Co., Ltd.) and UNISENCE FPA100L (manufactured by Senka Corporation).

In a case where the pretreatment liquid contains an aggregating agent, the content of the aggregating agent is not particularly limited, but the content thereof is preferably in a range of 0.1% by mass to 40% by mass, more preferably in a range of 0.1% by mass to 30% by mass, still more preferably in a range of 1% by mass to 20% by mass, and particularly preferably in a range of 1% by mass to 10% by mass with respect to the total amount of the pretreatment liquid.

(Surfactant)

The pretreatment liquid may contain at least one surfactant.

The surfactant can be used as a surface tension adjuster or an antifoaming agent.

Examples of the surface tension adjuster or the antifoaming agent include a non-ionic surfactant, a cationic surfactant, an anionic surfactant, and a betaine surfactant. Among these, from the viewpoint of the aggregation rate of the ink, a non-ionic surfactant or an anionic surfactant is preferable.

Examples of the surfactant include compounds exemplified as surfactants in pp. 37 and 38 of JP1984-157636A (JP-S59-157636A) and Research Disclosure No. 308119 (1989). Further, other examples of the surfactant include fluorine (fluorinated alkyl)-based surfactants and silicone-based surfactants described in JP2003-322926A, JP2004-325707A, and JP2004-309806A.

The content of the surfactant in the pretreatment liquid is not particularly limited, but the content thereof can be set such that the surface tension of the pretreatment liquid reaches preferably 50 mN/m or less, more preferably in a range of 20 mN/m to 50 mN/m, and still more preferably in a range of 30 mN/m to 45 mN/m.

(Other Additives)

The pretreatment liquid may contain other components in addition to the above-described components as necessary.

Examples of other components which can be contained in the pretreatment liquid include known additives such as a solid wetting agent, colloidal silica, an inorganic salt, a fading inhibitor, an emulsion stabilizer, a penetration enhancer, an ultraviolet absorbing agent, a preservative, an antibacterial agent, a pH adjuster, a viscosity adjuster, a rust inhibitor, and a chelating agent.

[Physical Properties of Pretreatment Liquid]

From the viewpoint of the aggregation rate of the ink, the pH of the pretreatment liquid at 25° C. is preferably in a range of 0.1 to 3.5.

In a case where the pH of the pretreatment liquid is 0.1 or greater, the roughness of the impermeable base material is further reduced and the adhesiveness of the image area is further improved.

In a case where the pH of the pretreatment liquid is 3.5 or less, the aggregation rate is further improved, coalescence of dots (ink dots) caused by the ink on the impermeable base material is further suppressed, and the roughness of the image is further reduced.

The pH (25° C.) of the pretreatment liquid is more preferably in a range of 0.2 to 2.0.

Further, the pH can be measured in a temperature environment of 25° C. using a pH meter WM-50EG (manufactured by DKK-Toa Corporation).

From the viewpoint of the aggregation rate of the ink, the viscosity of the pretreatment liquid is preferably in a range of 0.5 mPa·s to 10 mPa·s and more preferably in a range of 1 mPa·s to 5 mPa·s.

The viscosity of the pretreatment liquid is measured at 25° C. using VISCOMETER TV-22 (manufactured by Toki Sangyo Co., Ltd.).

The surface tension of the pretreatment liquid at 25° C. is preferably 60 mN/m or less, more preferably in a range of 20 mN/m to 50 mN/m, and still more preferably in a range of 30 mN/m to 45 mN/m.

In a case where the surface tension of the pretreatment liquid is in the above-described range, the adhesiveness between the impermeable base material and the pretreatment liquid is improved.

The surface tension of the pretreatment liquid is measured using an Automatic Surface Tensiometer CBVP-Z (manufactured by Kyowa Interface Science Co., Ltd.) according to a plate method.

<Base Material>

The base material in the present disclosure is an impermeable base material.

[Impermeable Base Material]

The impermeable base material used in the present disclosure has impermeability in which water contained in the ink composition is unlikely to be absorbed or not absorbed. Specifically, the impermeable base material is a base material having a water absorption amount of 10.0 $g/m^2$ or less.

The water absorption amount of the impermeable base material in the present disclosure is maintained at 25° C. for 1 minute in a state where water is brought into contact with a region having a size of 100 mm×100 mm on the image recorded surface of the impermeable base material, and the mass of absorbed water is acquired so that the absorption amount per unit area can be calculated.

The form of the impermeable base material used in the present disclosure is not particularly limited, and examples thereof include a sheet shape and a film shape.

From the viewpoint of the productivity of the image recorded material, it is preferable that the form of the impermeable base material used in the present disclosure is a long sheet or film wound in a roll shape.

Examples of the impermeable base material used in the present disclosure include polyester (PEN or PET), olefins such as PP, nylon, polyethylene, and OPP. In addition, a commercially available product may be used as the impermeable base material, and examples of the commercially available product include FE2001 (25 μm, resin base material, polyethylene terephthalate (PET) base material, manufactured by Futamura Chemical Co., Ltd.), PYRENE (registered trademark) film ST P6181 (25 μm, biaxially oriented polypropylene (OPP), manufactured by Toyobo Co., Ltd.), EMBLEM (registered trademark) ON-25 (25 μm, nylon, Unitika Ltd.).

The impermeable base material may have been subjected to a surface treatment.

Examples of the surface treatment include a corona treatment, a plasma treatment, a flame treatment, a heat treatment, an abrasion treatment, and a light irradiation treatment (UV treatment), but the present invention is not limited thereto.

For example, in a case where a corona treatment is applied to the surface of the impermeable base material before the ink is applied to record an image, the surface energy of the impermeable base material increases, and the wetting of the surface of the impermeable base material and adhesion of the ink to the impermeable base material are promoted. The corona treatment can be performed using Corona Master (manufactured by Shinko Electric & Instrumentation Co., Ltd., PS-10S) or the like.

The conditions for the corona treatment may be appropriately selected depending on the circumstances such as the kind of the impermeable base material and the composition of the ink. For example, the following treatment conditions may be employed.

Treatment voltage: 10 kV to 15.6 kV
Treatment speed: 30 to 100 mm/s

<Base Material for Image Recording>

The base material according to the embodiment of the present disclosure may be a base material for image recording, including an impermeable base material, and a pretreatment layer containing a solid content of the pretreatment liquid according to the embodiment of the present disclosure which is provided on at least one surface of the impermeable base material. That is, the base material according to the embodiment of the present disclosure may be a base material for recording an image on an impermeable base material with an aqueous ink, including an impermeable base material, and a pretreatment layer which contains a resin a having a glass transition temperature of lower than 25° C. and particles of a resin b having a glass transition temperature of 25° C. or higher.

[Pretreatment Layer]

The base material for image recording according to the embodiment of the present disclosure includes a pretreatment layer containing the solid content of the pretreatment liquid according to the embodiment of the present disclosure described above.

That is, the pretreatment layer in the base material for image recording is a layer containing a water-soluble polymer compound, a surfactant, and other additives, in addition to the resin a, the resin b, and the aggregating agent as necessary.

The pretreatment layer may be formed on at least a part of the surface of the base material for image recording on which an image is recorded, and examples of the form include a form in which the pretreatment layer is formed on the entire surface on which an image is recorded and a form in which the pretreatment layer is formed on a site from which end portions of the surface on which an image is recorded are removed.

In a case where the impermeable base material has a sheet shape or a film shape, the pretreatment layer may be formed on one surface or both surfaces of the impermeable base material.

In the present disclosure, the pretreatment layer may be a continuous layer, a discontinuous layer, or a layer with a non-uniform thickness.

The thickness of the pretreatment layer containing the above-described solid content is preferably in a range of 0.01 μm to 10 μm and more preferably in a range of 0.05 μm to 1 μm.

The thickness of the pretreatment layer is measured by cutting the base material for image recording and observing the cut surface with a scanning electron microscope. According to a method of measuring the thickness, a sample is cooled with liquid nitrogen, the sample is thinly sectioned using a microtome, the thicknesses of five optional cross-sectional portions are measured, and calculating the average thickness thereof.

It is preferable that the pretreatment layer does not contain water or the content of water is greater than 0% by mass and 20% by mass or less with respect to the total mass of the pretreatment layer and more preferable that the pretreatment layer does not contain water or the total content of water is greater than 0% by mass and 5% by mass or less with respect to the total mass of the solid content.

The content of water content is measured according to the following Karl Fischer measurement method.

The amount of moisture (mg) is measured using a Karl Fischer Moisture Meter (Mitsubishi Chemical Analytech CA-06 type Coulometric titration moisture analyzer), and the moisture content (%) is calculated based on Equation (A). Further, the measurement sample indicates a sample obtained by taking out only the solid content from the base material.

$$\text{Moisture content (\%)} = [\text{amount of moisture (mg)}/\text{measurement sample (mg)}] \times 100 \quad \text{Equation (A)}$$

Detailed conditions for the measurement are in conformity with JIS K0113: 2005.

The pretreatment layer is obtained, for example, by drying the pretreatment liquid according to the embodiment of the present disclosure.

Here, the drying indicates that at least some of the water contained in the pretreatment liquid is removed.

The drying method is not particularly limited, and examples thereof include drying by heating, drying by air blowing, and natural drying.

From the viewpoints of enhancing the adhesiveness of the image and suppressing the peeling of the image, it is preferable that the amount of the pretreatment layer in the base material for image recording is set such that the amount of the resin a and the resin b is in a range of 0.1 g/m² to 3.0 g/m² and more preferable that the amount of the pretreatment layer is set such that the amount of the resin a and the resin b is in a range of 0.3 g/m² to 2.0 g/m².

<Method of Producing Base Material for Image Recording>

The method of producing a base material for image recording according to the embodiment of the present disclosure includes a step of adding the pretreatment liquid according to the embodiment of the present disclosure onto the impermeable base material (hereinafter, also referred to as a pretreatment liquid adding step).

It is preferable that the method of producing a base material for image recording includes a step of drying the applied pretreatment liquid (hereinafter, also referred to as a drying step) after the step of adding the pretreatment liquid (that is, the pretreatment liquid adding step).

[Pretreatment Liquid Adding Step]

The pretreatment liquid adding step in the method of producing a base material for image recording can be performed by employing a known method such as a coating method, an ink jet method, or an immersion method.

The application can be performed according to a known coating method using, an extrusion die coater, an air doctor coater, a blade coater, a rod coater, a knife coater, a squeeze coater, a reverse roll coater, or a bar coater.

The details of the ink jet method are the same as the details of the ink jet method in an image recording step described below.

[Drying Step]

The drying of the pretreatment liquid in the method of producing a base material for image recording may be any of drying by heating, drying by air blowing, and natural drying. Among these, drying by heating is preferable.

Examples of the means for heating and drying the ink include known heating means such as a heater, known air blowing means such as a dryer, and means for combining these.

The heating temperature of heating and drying the ink is preferably 60° C. or higher, more preferably 65° C. or higher, and particularly preferably 70° C. or higher. The upper limit of the heating temperature is not particularly limited, and the upper limit thereof may be 100° C. and preferably 90° C.

<Ink Set>

An ink set according to the embodiment of the present disclosure includes an ink composition containing a colorant and water, and the pretreatment liquid according to the embodiment of the present disclosure.

Specific examples thereof include an ink set that contains ink compositions of four colors of cyan, magenta, yellow, and black and the pretreatment liquid according to the embodiment of the present disclosure.

Hereinafter, the ink composition contained in the ink set used in the present disclosure will be described in detail.

[Ink Composition]

Hereinafter, the ink composition used in the embodiment of the present disclosure will be described.

The ink composition used in the present disclosure is an aqueous ink containing a colorant and water.

In the present disclosure, the aqueous ink indicates an ink composition containing 50% by mass or greater of water with respect to the total mass of the ink.

Further, the content of the organic solvent in the ink composition of the present disclosure is preferably 40% by mass or less and more preferably 30% by mass or less with respect to the total mass of the ink composition.

Further, it is preferable that the ink composition of the present disclosure does not contain a polymerizable compound or the content of the polymerizable compound is greater than 0% by mass and 10% by mass or less and more preferable that the ink composition does not contain a polymerizable compound.

Examples of the polymerizable compound include a cationic polymerizable compound and a radical polymerizable compound.

(Colorant)

The colorant is not particularly limited and a colorant known in the field of the ink jet ink can be used, but an organic pigment or an inorganic pigment is preferable.

Examples of the organic pigment include an azo pigment, a polycyclic pigment, a chelate dye, a nitro pigment, a nitroso pigment, and aniline black. Among these, an azo pigment and a polycyclic pigment are more preferable.

Examples of the inorganic pigment include titanium oxide, iron oxide, calcium carbonate, barium sulfate, aluminum hydroxide, yellow barium, cadmium red, chrome yellow, and carbon black. Among these, carbon black is particularly preferable.

Preferred examples of the colorant include the colorants described in paragraphs 0096 to 0100 of JP2009-241586A.

The content of the colorant is preferably in a range of 1% by mass to 25% by mass, more preferably in a range of 2% by mass to 20% by mass, still more preferably in a range of 5% by mass to 20% by mass, and particularly preferably in a range of 5% by mass to 15% by mass with respect to the total mass of the ink composition.

(Water)

The ink composition contains water.

The content of water is preferably in a range of 50% by mass to 90% by mass and more preferably in a range of 60% by mass to 80% by mass with respect to the total mass of the ink composition.

(Dispersant)

The ink composition used in the present disclosure may contain a dispersant for dispersing the colorant.

As the dispersant, any of a polymer dispersant or a low-molecular-weight surfactant-type dispersant may be used. Further, as the polymer dispersant, any of a water-soluble dispersant or a water-insoluble dispersant may be used.

Preferred examples of the dispersant include dispersants described in paragraphs 0080 to 0096 of JP2016-145312A.

The mixing mass ratio between a colorant (p) and a dispersant (s) (p:s) is preferably in a range of 1:0.06 to 1:3, more preferably in a range of 1:0.125 to 1:2, and still more preferably in a range of 1:0.125 to 1:1.5.

(Resin Particles)

It is preferable that the ink composition in the present disclosure contains at least one kind of resin particles.

In a case where the ink composition contains resin particles, the fixing property of mainly the ink composition to the impermeable base material and the rub resistance can be improved. Further, the resin particles have a function of fixing the ink composition, that is, an image by being unstably aggregated or dispersed in a case of being contact with the aggregating agent described above and thickening the ink composition. It is preferable that such resin particles are dispersed in water or a water-containing organic solvent.

Preferred examples of the resin particles include the resin particles described in paragraphs 0062 to 0076 of JP2016-188345A.

(Water-Soluble Organic Solvent)

It is preferable that the ink composition used in the present disclosure contains at least one water-soluble organic solvent.

By using a water-soluble organic solvent, the effect of preventing drying of the ink composition and the effect of wetting of the ink composition can be obtained. The water-soluble organic solvent is used as an anti-drying agent for preventing clogging caused due to an aggregate which is formed in a state where the ink adheres and is dried at an ink jet port of an ejection nozzle. Further, a water-soluble organic solvent having a lower vapor pressure than that of water is preferable for preventing drying of the ink composition and for wetting of the ink composition.

As the anti-drying agent, a water-soluble organic solvent which has a lower vapor pressure than that of water is preferable. Specific examples of such a water-soluble organic solvent include polyhydric alcohols represented by ethylene glycol, propylene glycol, diethylene glycol, polyethylene glycol, thiodiglycol, dithiodiglycol, 2-methyl-1,3-propanediol, 1,2,6-hexanetriol, an acetylene glycol derivative, glycerin, and trimethylolpropane.

Among these, polyhydric alcohol such as glycerin or diethylene glycol is preferable as the anti-drying agent.

The anti-drying agent may be used alone or in combination of two or more kinds thereof. The content of the anti-drying agent is preferably in a range of 10% to 50% by mass with respect to the total mass of the ink composition.

The water-soluble organic solvent is used for adjusting the viscosity in addition to the purposes described above.

Specific examples of the water-soluble organic solvent which can be used for adjusting the viscosity include alcohols (such as methanol, ethanol, propanol, isopropanol, butanol, isobutanol, sec-butanol, t-butanol, pentanol, hexanol, cyclohexanol, and benzyl alcohol), polyhydric alcohols (such as ethylene glycol, diethylene glycol, triethylene glycol, polyethylene glycol, propylene glycol, dipropylene glycol, polypropylene glycol, butylene glycol, hexanediol, pentanediol, glycerin, hexanetriol, and thiodiglycol), glycol derivatives (such as ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, and ethylene glycol monophenyl ether), amines (such as ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, and tetramethylpropylenediamine), and other polar solvents (such as formamide, N,N-dimethylformamide, N,N-dimethylacetamide, dimethyl sulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, and acetone).

Even in a case, the water-soluble organic solvent may also be used alone or in combination of two or more kinds thereof.

(Other Additives)

The ink composition used in the present disclosure can be formed using additives other than the above-described components.

Examples of other additives include known additives such as an anti-drying agent (wetting agent) other than those described above, a fading inhibitor, an emulsion stabilizer, a penetration enhancer, an ultraviolet absorbing agent, a preservative, an antibacterial agent, a pH adjuster, a surface tension adjuster, an antifoaming agent, a viscosity adjuster, a dispersant other than those described above, a dispersion stabilizer, a rust inhibitor, and a chelating agent.

<Image Recording Method>

An image recording method according to the present disclosure includes a step of adding the pretreatment liquid according to the embodiment of the present disclosure to a surface of the impermeable base material (hereinafter, also referred to as a "pretreatment liquid adding step"), and a step of jetting the ink composition containing a colorant and water by an ink jet method onto the surface of the impermeable base material to which the pretreatment liquid has been applied and recording an image (hereinafter, also referred to as an "image recording step").

[Pretreatment Liquid Adding Step]

The pretreatment liquid adding step in the image recording method can be performed by employing a known method such as a coating method, an ink jet method, or an immersion method.

The application can be performed according to a known coating method using a bar coater, an extrusion die coater, an air doctor coater, a blade coater, a rod coater, a knife coater, a squeeze coater, a reverse roll coater, or a bar coater.

The details of the ink jet method are the same as the details of the ink jet method in an image recording step described below.

The application amount of the pretreatment liquid is not particularly limited as long as the ink composition can be aggregated. However, from the viewpoints of enhancing the adhesiveness of the image and suppressing the peeling of the image, it is preferable that the application amount of the pretreatment liquid is set such that the application amount of the pretreatment liquid after being dried reaches 0.05 g/m$^2$ or greater and more preferable that the application amount thereof is set such that the application amount of the pretreatment liquid after being dried reaches 0.05 g/m$^2$ to 1.0 g/m$^2$.

Further, the impermeable base material may be heated before the pretreatment liquid is applied.

The heating temperature may be appropriately set depending on the kind of the impermeable base material and the composition of the pretreatment liquid, but the temperature of the impermeable base material is preferably in a range of 30° C. to 70° C. and more preferably in a range of 30° C. to 60° C.

As the impermeable base material used in the image recording method according to the embodiment of the present disclosure, as necessary, a surface-treated impermeable base material may be used. Alternatively, a surface treatment may be performed on an impermeable base material before being coated with the pretreatment liquid in the pretreatment liquid adding step using an impermeable base material to which the surface treatment has not been subjected.

Examples of the surface treatment include the treatment described as the surface treatment of the impermeable base material in the base material for image recording according to the present disclosure, and these treatments can be performed by a known method.

[Image Recording Step]

In the image recording step according to the image recording method, an image is recorded by jetting the ink composition containing a colorant and water onto the surface of the impermeable base material to which the pretreatment liquid has been applied according to an ink jet method.

That is, the image recording step is a step of applying the ink composition to the impermeable base material according to an ink jet method.

In the present step, the ink can be selectively applied onto the impermeable base material, and a desired visible image can be formed.

As the ink composition used in the image recording step, the above-described ink composition contained in the ink set according to the embodiment of the present disclosure is suitably used.

In the image formation according to an ink jet method, a colored image is formed by providing the energy so that the ink is jetted onto a desired impermeable base material.

Further, as a preferable ink jet method in the present disclosure, the method described in paragraphs 0093 to 0105 of JP2003-306623A can be employed.

The ink jet method is not particularly limited, and any of known methods such as an electric charge control method of jetting an ink using electrostatic attraction force; a drop-on-demand method (pressure pulse method) using a vibration pressure of a piezoelectric element; an acoustic ink jet method of jetting an ink using a radiation pressure by converting an electric signal into an acoustic beam and irradiating the ink with the acoustic beam; and a thermal ink jet (also referred to as a bubble jet (registered trademark)) method of heating an ink to form bubbles and utilizing the generated pressure may be used. As an ink jet method, particularly, an ink jet method, described in JP1979-059936A (JP-S54-059936A), of jetting an ink from a nozzle using an action force caused by a rapid change in volume of the ink after being subjected to an action of thermal energy can be effectively used.

A short serial head is used as the ink jet head, and there are two systems for the ink jet head, which are a shuttle system of performing recording while scanning a head in the width direction of the impermeable base material and a line system of using a line head in which recording elements are aligned in correspondence with the entire area of one side of the impermeable base material. In the line system, image recording can be performed on the entire surface of the impermeable base material by scanning the impermeable base material in a direction intersecting the direction in which the recording elements are aligned. Therefore, a transport system such as a carriage that scans a short head is unnecessary. Further, since movement of a carriage and complicated scanning control between the head and the impermeable base material is unnecessary and only the impermeable base material moves, the recording at a higher recording speed compared to the shuttle system can be realized. The image recording method according to the embodiment of the present disclosure can be applied to any of these, but an effect of improving the jetting accuracy and the rub resistance of an image increases in a case where the image recording method is applied to the line system that does not usually perform a dummy jet.

From the viewpoint of obtaining an image with high definition, the liquid droplet amount of the ink to be jetted from the ink jet head is preferably in a range of 1 pl (pico liter) to 10 pl and more preferably in a range of 1.5 pl to 6 pl. In addition, from the viewpoints of improving the image irregularity and improving connection of continuous gradations, it is also effective that the ink is jetted by combining different amounts of liquid droplets.

[Drying Step]

The image recording method according to the embodiment of the present disclosure may include a drying step.

The drying step can be performed at any one or both timings after the pretreatment liquid adding step and before the image recording step, and after the image recording step.

As the drying in the drying step, drying by heating is preferable.

Examples of the means for heating and drying the ink include known heating means such as a heater, known air blowing means such as a dryer, and means for combining these.

In the heating step after the image recording step, the image can be dried by being heated.

Examples of the method of performing heating and drying the image include a method of applying heat from a side of the impermeable base material opposite to the image forming surface thereof using a heater or the like, a method of applying warm air or hot air to the image forming surface of the impermeable base material, a method of applying heat from the image forming surface of the impermeable base material or from a side of the impermeable base material opposite to the image forming surface using an infrared heater, and a method of combining a plurality of these methods.

The heating temperature of the image at the time of heating and drying is preferably 60° C. or higher, more preferably 65° C. or higher, and particularly preferably 70° C. or higher.

The upper limit of the heating temperature is not particularly limited, and the upper limit thereof may be 100° C. and preferably 90° C.

The time of heating and drying the image is not particularly limited, but is preferably in a range of 3 seconds to 60 seconds, more preferably in a range of 5 seconds to 30 seconds, and particularly preferably in a range of 5 seconds to 20 seconds.

<Another Embodiment of Image Recording Method>

Another embodiment of the image recording method according to the embodiment of the present disclosure includes a step of jetting the ink composition containing a colorant and water by an ink jet method onto a pretreatment layer of the base material for image recording according to the embodiment of the present disclosure and recording an image.

The image recording step has the same definition as that for the image recording step in the image recording method described above, and the preferable embodiments are the same as described above.

Further, another embodiment of the image recording method may include a drying step. The details of the drying step are the same as the drying step in the above-described image recording method, and the preferable embodiments are also the same as described above.

<Image Recorded Material>

An image recorded material according to the embodiment of the present disclosure includes the base material for image recording according to the embodiment of the present disclosure and an image containing a colorant.

The image recorded material according to the embodiment of the present disclosure is obtained using the above-described image recording method according to the embodiment of the present disclosure.

The pretreatment liquid according to the embodiment of the present disclosure contains the resin a, the resin b, and an aggregating agent. Since the colorant supplied from the ink is aggregated due to the function of the aggregating agent in the pretreatment liquid, and the adhesiveness between the colorant and the impermeable base material is also enhanced due to the function of the resin a and the resin b, the image recorded material according to the embodiment of the present disclosure has excellent adhesiveness of the image and an excellent image quality.

[Image Recording Device]

An image recording device used for the image recording method according to the embodiment of the present disclosure is not particularly limited as long as the image recording device includes image recording means for performing an ink jet method.

As the image recording means for performing an ink jet method, for example, known ink jet recording devices described in JP2010-083021A, JP2009-234221A, and JP1998-175315A (JP-H10-175315A) can be used.

Examples

Hereinafter, an embodiment of the present disclosure will be described in more detail based on examples, but the present disclosure is not limited to the following examples unless the gist thereof is overstepped. Further, "parts" are on a mass basis unless otherwise specified.

In the present example, the volume average particle diameter was acquired by performing measurement at a liquid temperature of 25° C. according to a dynamic light scattering method using a nanotrac particle size distribution measuring apparatus UPA-EX150 (manufactured by Nikkiso Co., Ltd.) for an aqueous dispersion liquid of resin particles adjusted such that the concentration of solid contents was 10% by mass.

The glass transition temperature (Tg) was acquired by performing measurement at a temperature rising rate of 10° C./min using a differential scanning calorimeter (DSC) EXSTAR 6220 (manufactured by SII Nanotechnology Inc.).

Further, the weight-average molecular weight was measured by gel permeation chromatography (GPC).

Specifically, the measurement according to GPC was performed using HLC (registered trademark)-8220GPC (manufactured by Tosho Corporation) as a measuring device, three columns of TSKgel, Super Multipore HZ-H (manufactured by Tosoh Corporation, 4.6 mmID×15 cm), and tetrahydrofuran (THF) as an eluent. Further, as the measurement conditions, the measurement was performed at a sample concentration of 0.45% by mass, a flow rate of 0.35 ml/min, a sample injection volume of 10 μl, and a measurement temperature of 40° C. using a refractive index (RI) detector. Further, the calibration curve was prepared using eight samples of "F-40", "F-20", "F-4", "F-1", "A-5000", "A-2500", "A-1000", and "n-propylbenzene" which are "Standard Samples TSK standard, polystyrene" (manufactured by Tosoh Corporation).

(Synthesis of Acrylic Resin A8)

3.0 g of sodium dodecyl benzene sulfonate (62 mass % aqueous solution, manufactured by Tokyo Chemical Industry Co., Ltd.) and 454 g of water were added to a 1000 mL three-neck flask provided with a stirrer and a cooling pipe, and the solution was heated to 90° C. in a nitrogen atmosphere. A solution A obtained by dissolving 10.0 g of a 50 mass % aqueous solution of 2-acrylamido-2-methyl-1-propanesulfonic acid sodium salt (AMPS-Na) (manufactured by Sigma-Aldrich Co., LLC) in 20 g of water, a solution B obtained by mixing 35.0 g of benzyl methacrylate (BzMA; manufactured by Wako Pure Chemical Industries, Ltd.) with 10.0 g of cyclohexyl methacrylate (CyHMA; manufactured by Wako Pure Chemical Industries, Ltd.), and a solution C obtained by dissolving 6.0 g of sodium persulfate (manufactured by Wako Pure Chemical Industries, Ltd.) in 40 g of water were simultaneously added dropwise to the heated mixed solution in the three-neck flask for 3 hours. After the dropwise addition, 567 g of an aqueous dispersion liquid of particles of an acrylic resin A8 (the amount of the solid content of the acrylic resin A8: 10.2% by mass) was synthesized by allowing the resulting solution to further react for 3 hours.

The volume average particle diameter of the particles of the acrylic resin A8 in the aqueous dispersion liquid was 30 nm, and the glass transition temperature thereof was 54° C. Further, the weight-average molecular weight of the acrylic resin A8 was 32000.

(Synthesis of Acrylic Resins A1 to A7, A9, A10, C1, and C2)

The acrylic resin A8 was synthesized in the same manner as in the synthesis of the acrylic resin A8 except that the kinds and the mass ratios of the raw material monomers were changed as listed in Table 3. Further, the results obtained by measuring the glass transition temperatures and weight-average molecular weights of the acrylic resins A1 to A7, A9, A10, C1, and C2 are listed in Table 3.

TABLE 3

| | AMPS-Na | BzMA | St | IBOMA | CyHMA | nBMA | MMA | MAA | 2-EHA | 2-MEA | ACMO | HEAAm | NIPAM | Tg | Weight-average molecular weight |
|---|---|---|---|---|---|---|---|---|---|---|---|---|---|---|---|
| A1 | 5 | 45 | — | — | — | — | — | — | 50 | — | — | — | — | −7 | 43000 |
| A2 | 5 | — | 20 | — | — | — | 25 | — | 50 | — | — | — | — | 6 | 57000 |
| A3 | 5 | — | 2 | — | — | — | — | — | — | 45 | 48 | — | — | 11 | 89000 |
| A4 | 5 | — | 20 | — | — | — | 35 | — | — | 35 | — | 5 | — | 17 | 36000 |
| A5 | 10 | — | 23 | — | 20 | — | — | 37 | — | — | — | — | — | 22 | 41000 |
| A6 | 5 | — | 30 | — | — | 65 | — | — | — | — | — | — | — | 27 | 66000 |
| A7 | 10 | — | 25 | — | — | — | 25 | — | — | — | — | 15 | 25 | 48 | 29000 |
| A8 | 10 | 70 | — | — | 20 | — | — | — | — | — | — | — | — | 54 | 32000 |
| A9 | 10 | — | 30 | — | — | — | — | — | — | — | 30 | — | 30 | 71 | 54000 |
| A10 | 11 | — | 30 | 30 | — | — | 29 | — | — | — | — | — | — | 93 | 73000 |
| C1 | 18.2 | — | 27.3 | — | — | — | 18.2 | 36.3 | — | — | — | — | — | 140 | 47000 |
| C2 | 33.3 | 25 | — | — | — | — | 41.7 | — | — | — | — | — | — | 100 | 48000 |

The addition amount in Table 3 is a mass ratio, the unit of Tg is ° C., and "—" in Table 3 indicates that no component is contained.

Further, the details of each component in Table 3 are as follows.

AMPS-Na: 2-acrylamido-2-methyl-1-propanesulfonic acid sodium salt solution (50 mass % aqueous solution), manufactured by Sigma-Aldrich Co., LLC BzMA: benzyl methacrylate, manufactured by Wako Pure Chemical Industries, Ltd.

St: styrene monomer, manufactured by Wako Pure Chemical Industries, Ltd.

IBOMA: isobornyl methacrylate, manufactured by Wako Pure Chemical Industries, Ltd.

CyHMA: cyclohexyl methacrylate, manufactured by Wako Pure Chemical Industries, Ltd.

nBMA: butyl methacrylate, manufactured by Wako Pure Chemical Industries, Ltd.

MMA: methyl methacrylate, manufactured by Wako Pure Chemical Industries, Ltd.

MAA: methacrylic acid, manufactured by Wako Pure Chemical Industries, Ltd.

2-EHA: 2-ethylhexyl acrylate, manufactured by Wako Pure Chemical Industries, Ltd.

2-MEA: 2-methoxyethyl acrylate, manufactured by Wako Pure Chemical Industries, Ltd.

ACMO: 4-acryloylmorpholine, manufactured by Wako Pure Chemical Industries, Ltd.

HEAAm: N-(2-hydroxyethyl)acrylamide, manufactured by Tokyo Chemical Industry Co., Ltd.

NIPAM: N-isopropylacrylamide, manufactured by Wako Pure Chemical Industries, Ltd.

(Synthesis of Ester Resin E2)

A mixture of dimethyl isophthalate (abbreviation: IPA-Me, manufactured by Wako Pure Chemical Industries, Ltd., 60.2 g), dimethyl 2,6-naphthalenedicarboxylate (abbreviation: NDA-Me, manufactured by Tokyo Chemical Industry, 24.4 g), dimethyl sodium 5-sulfoisophthalate (abbreviation: SSIPA-Me, manufactured by Tokyo Chemical Industry Co., Ltd., 26.7 g), diethylene glycol (abbreviation: DEG manufactured by Wako Pure Chemical Industries, Ltd., 37.1 g), Bisphenol A ethoxylate (abbreviation: BPA-EO, manufactured by Sigma-Aldrich Co., LLC, 17.7 g), and tetraethyl orthotitanate (Tokyo Chemical Industry Co., Ltd., 100 µL) was heated and stirred at 200° C. for 3 hours in a nitrogen stream so that generated methanol was distilled off.

Next, the mixture was heated and stirred at 250° C. for 3 hours under reduced pressure at 2 Torr or less, and a transesterification reaction was carried out while excess diethylene glycol was removed. Thereafter, the obtained reaction product was taken out into a heat-resistant container processed with Teflon (registered trademark), thereby obtaining an ester resin E2.

The glass transition temperature thereof was 64° C. The weight-average molecular weight of the ester resin E2 was 101000.

(Preparation of Aqueous Dispersion of Polyester Resin)

75% by mass of water and 5% by mass of isopropanol were added to the ester resin E2 such that the concentration of the ester resin E2 was set to 10% by mass, and the mixture was heated and stirred at 80° C. for 1 hour, thereby obtaining an aqueous dispersion of the ester resin E2.

The volume average particle diameter of the ester resin E2 in the aqueous dispersion liquid was 40 nm.

(Synthesis of Ester Resin E1)

An ester resin E1 was synthesized in the same manner as in the synthesis of the ester resin E2 except that the kind and the mass ratio of the raw material monomers were changed as listed in Table 4 in the synthesis of the ester resin E2. The results obtained by measuring the glass transition temperature and the weight-average molecular weight are listed in Table 4.

TPA-Me: dimethyl terephthalate, manufactured by Wako Pure Chemical Industries, Ltd.

NDA-Me: dimethyl 2,6-naphthalenedicarboxylate, manufactured by Tokyo Chemical Industry Co., Ltd.

SSIPA-Me: dimethyl sodium 5-sulfoisophthalate, manufactured by Tokyo Chemical Industry Co., Ltd.

SSA-Me: dimethyl sodium sulfosuccinate

CHDM: 1,4-cyclohexanedimethanol, manufactured by Wako Pure Chemical Industries, Ltd.

DEG: diethylene glycol, Wako Pure Chemical Industries, Ltd.

BPA-EO: Bisphenol A ethoxylate, manufactured by Sigma-Aldrich Co., LLC

Further, the dimethyl sodium sulfosuccinate was synthesized by the following method.

(Preparation of Dimethyl Sodium Sulfosuccinate)

Methanol (100 g) was added to a 70% aqueous solution of sulfosuccinic acid (manufactured by Sigma-Aldrich Co., LLC, 50.0 g), and the solution was distilled off under reduced pressure at an external temperature of 80° C. Further, methanol (100 g) was added thereto again, and the operation of distilling the solution off under reduced pressure at an external temperature of 80° C. was repeated twice. Methanol (150 g) was added to the obtained concentrate, and a 50% sodium hydroxide aqueous solution (51.0 g) was added dropwise thereto little by little while stirring the system under a condition of 20° C. or lower to adjust the pH to 7. Thereafter, precipitation was observed in a case of continuously stirring the solution for 1 hour. The precipitate was filtered off and dried at 80° C. under reduced pressure, thereby obtaining dimethyl sodium sulfosuccinate (SSA-Me, 36.8 g, white solid).

(Synthesis of Urethane Resin U1)

FUM-1000 (abbreviation: AES, manufactured by FFFC), Blemmer GLM (abbreviation: Blemmer, manufactured by NOF Corporation), Adeka Polyether BPX-1000 (Abbreviation: BP13P, manufactured by ADEKA Corporation), 1,12-dodecanediol (abbreviation: DDQ manufactured by Wako Pure Chemical Industries, Ltd.), and 4,4'-diphenylmethane diisocyanic acid (abbreviation: MDI, Tokyo Chemical Industry Co., Ltd.) were added to a previously nitrogen-substituted container equipped with a reflux condenser and a stirrer to obtain a 50% solution of methyl ethyl ketone at a mass ratio listed in Table 5, di-n-butyltin laurate serving as a reaction catalyst was added thereto, and the resulting solution was stirred at 60° C. for 1 hour under a nitrogen stream.

Further, 0.01 parts by weight of di-n-butyltin laurate serving as a reaction catalyst was added to the polymerization components (total amount of polyol and polyisocyanate).

TABLE 4

|    | IPA-Me | TPA-Me | NDA-Me | SSIPA-Me | SSA-Me | CHDM | DEG | BPA-EO | Tg | Weight-average molecular weight |
|----|--------|--------|--------|----------|--------|------|-----|--------|-----|-------------------|
| E1 | 54     | —      | —      | —        | 10     | 22   | 7   | 14     | 19  | 101000            |
| E2 | —      | 41     | 17     | 18       | —      | —    | 25  | 12     | 64  | 89000             |

The addition amount in Table 4 is a mass ratio, the unit of Tg is ° C., and "—" in Table 4 indicates that no component is contained.

The details of each component in Table 4 are as follows.

IPA-Me: dimethyl isophthalate, manufactured by Wako Pure Chemical Industries, Ltd.

The glass transition temperature thereof was 14° C. Further, the weight-average molecular weight of the urethane resin U1 was 75000.

Next, the mixture was heated and stirred at 100° C. for 3 hours under reduced pressure at 2 Torr or less to remove excess methyl ethyl ketone. Thereafter, the obtained reaction product was taken out into a heat-resistant container processed with Teflon (registered trademark), thereby obtaining a urethane resin U1.

(Preparation of Aqueous Dispersion of Urethane Resin)

75% by mass of water and 5% by mass of isopropanol were added to the urethane resin U1 such that the concentration of the urethane resin U1 was set to 10% by mass, and the mixture was heated and stirred at 80° C. for 1 hour, thereby obtaining an aqueous dispersion of the urethane resin U1.

The volume average particle diameter of the urethane resin U1 in the aqueous dispersion liquid was 90 nm.

(Synthesis of Urethane Resins U2 and U3)

Urethane resins U2 and U3 were synthesized in the same manner as in the synthesis of the urethane resin U1 except that the kinds and the mass ratios of the raw material monomers were changed as listed in Table 5 in the synthesis of the urethane resin U1. The results obtained by measuring the glass transition temperature and the weight-average molecular weight are listed in Table 5.

TABLE 5

|    | AES  | TCDM | BP13P | Blemmer GLM | MDI  | DDG | 1,4-BDM | Tg | Weight-average molecular weight |
|----|------|------|-------|-------------|------|-----|---------|----|-------|
| U1 | 1    | —    | 5.8   | 1.95        | 12.5 | 6   | —       | 14 | 75000 |
| U2 | 1    | —    | 8.7   | 0.8         | 11.7 | 4.8 | 1       | 18 | 62000 |
| U3 | 1.00 | 3.09 | 18.37 | 1.95        | 12.1 | —   | —       | 44 | 87000 |

The addition amount in Table 5 is a mass ratio, the unit of Tg is ° C., and "-" in Table 5 indicates that no component is contained.

The details of each component in Table 5 are as follows.

AES: FUM-1000, manufactured by Fujifilm Fine Chemicals Co., Ltd.

TCDM: tricyclodecane dimethanol, manufactured by Tokyo Chemical Industry Co., Ltd.

BP13P: Adeka Polyether BPX-1000, manufactured by ADEKA Corporation

Blemmer GLM: Blemmer GLM, NOF Corporation

MDI: 4,4'-diphenylmethane diisocyanic acid, manufactured by Tokyo Chemical Industry Co., Ltd.

DDG: 1,12-dodecanediol, manufactured by Wako Pure Chemical Industries, Ltd.

1,4-BDM: p-xylene-α,α'-diol, manufactured by Wako Pure Chemical Industries, Ltd.

(Synthesis of Core Shell Particles D1)

A mixed solution of 9.4 g of benzyl methacrylate (BzMA: Wako Pure Chemical Industries, Ltd.) and 3.1 g of cyclohexyl methacrylate (CyHMA: Wako Pure Chemical Industries, Ltd.) and a solution obtained by dissolving 1.5 g of sodium persulfate (manufactured by Wako Pure Chemical Industries, Ltd.) in 10 g of water were simultaneously added dropwise to the dispersion liquid (10.2% by mass) obtained by the synthesis of the acrylic resin A2 for 3 hours. After the dropwise addition, 602 g of an aqueous dispersion liquid of core shell particles D1 containing particles of the acrylic resin A11 as a core and the acrylic resin A2 as a shell (the amount of the solid content: 13.0% by mass) was obtained by allowing the resulting solution to further react for 3 hours.

The results obtained by measuring the glass transition temperatures and the weight-average molecular weights of A11 and A2 are listed in Table 6. Further, the volume average particle diameter of the core shell particles D1 in the obtained aqueous dispersion liquid was 45 nm.

(Synthesis of Core Shell Particles D2 and D3)

Core shell particles D2 and D3 were synthesized in the same manner as in the synthesis of the core shell particles D1 except that the resin contained as the core listed in Table 6 was synthesized by changing the dispersion obtained in the synthesis of A2 to the dispersion liquid of the resin contained as the shell in Table 6 and the kinds and the mass ratios of the raw material monomers of the resins constituting the cores were shown as listed in Table 6 in the synthesis of the core shell particles D1.

The results obtained by measuring the glass transition temperatures and weight-average molecular weights of each resin are listed in Table 6. Further, the volume average particle diameters of the core shell particles D2 and the core shell particles D3 in the obtained aqueous dispersion liquid were respectively 55 nm and 110 nm.

TABLE 6

|    |       |     | BzMA | St | CyHMA | MMA | ACMO | HEAAm | NIPAM | Tg | Weight-average molecular weight |
|----|-------|-----|------|----|-------|-----|------|-------|-------|----|--------|
| D1 | Core  | A11 | 75   | —  | 25    | —   | —    | —     | —     | 53 | 52000  |
|    | Shell | A2  |      |    |       | —   |      |       |       | 6  | 57000  |
| D2 | Core  | A12 | —    | 20 | —     | —   | 60   | —     | 20    | 72 | 27000  |
|    | Shell | E1  |      |    |       | —   |      |       |       | 19 | 101000 |
| D3 | Core  | A13 | —    | 40 | —     | 10  | —    | 25    | 25    | 49 | 31000  |
|    | Shell | U2  |      |    |       | —   |      |       |       | 18 | 62000  |

The details of each component in Table 6 are the same as the details of each component in Table 3 described above.

(Preparation of Ink Composition)

Respective components described in the section of "composition of magenta ink" below were mixed to prepare magenta ink.

Further, respective components described in the section of "composition of cyan ink" below were mixed to prepare cyan ink.

<Composition of Magenta Ink>
Projet Magenta APD1000 (manufactured by FUJIFILM Imaging Colorants Ltd, magenta pigment dispersion liquid, pigment concentration: 14% by mass): 30% by mass
Polymer particle aqueous dispersion: 8% by mass
Propylene glycol (PG): 20.0% by mass
OLFINE E1010 (surfactant, manufactured by Nissin Chemical Co., Ltd.): 1.0% by mass
Ion exchange water: remaining amount set such that the total amount of the composition was 100% by mass <Composition of Cyan Ink>
Projet Cyan APD1000 (manufactured by FUJIFILM Imaging Colorants Ltd., cyan pigment dispersion liquid, pigment concentration: 12% by mass): 20% by mass
Polymer particle aqueous dispersion: 8% by mass
Propylene glycol (PG: water-soluble solvent): 20.0% by mass
OLFINE E1010 (surfactant, manufactured by Nissin Chemical Co., Ltd.): 1.0% by mass
Ion exchange water: remaining amount set such that the total amount of the composition was 100% by mass

[Synthesis of Polymer Particle Aqueous Dispersion]

The polymer particle aqueous dispersion was prepared in the following manner.

A 2 L three-neck flask provided with a stirrer, a thermometer, a reflux cooling pipe, and a nitrogen gas introduction pipe was charged with 560.0 g of methyl ethyl ketone, and the solution was heated to 87° C. Next, a mixed solution formed of 220.4 g of methyl methacrylate, 301.6 g of isobornyl methacrylate, 58.0 g of methacrylic acid, 108 g of methyl ethyl ketone, and 2.32 g of "V-601" (polymerization initiator, manufactured by Wako Pure Chemical Industries, Ltd., dimethyl 2,2'-azobis(2-methyl propionate)) was added dropwise to the methyl ethyl ketone in the reaction container at a constant speed such that the dropwise addition was completed for 2 hours while the reflux state in the reaction container was maintained (hereinafter, the reflux state was maintained until the reaction was completed). After completion of the dropwise addition, the solution was stirred for 1 hour, and the operation of the following step (1) was performed on the solution after being stirred for 1 hour.

Step (1) . . . A solution formed of 1.16 g of "V-601" and 6.4 g of methyl ethyl ketone was added to the solution, and the resulting solution was stirred for 2 hours.

Next, the operation of the step (1) was repeatedly performed four times, a solution formed of 1.16 g of "V-601" and 6.4 g of methyl ethyl ketone was added to the solution, and the resulting solution was stirred for 3 hours (the operation carried out so far is referred to as the "reaction").

After the completion of the reaction, the temperature of the solution was decreased to 65° C., 163.0 g of isopropanol was added to the solution, and the solution was allowed to be naturally cooled, thereby obtaining a polymerization solution (concentration of solid contents: 41.0%) containing a copolymer of methyl methacrylate, isobornyl methacrylate, and methacrylic acid (=38/52/10 [mass ratio]).

The weight-average molecular weight (Mw) of the copolymer was 63000, and the acid value thereof was 65.1 (mgKOH/g).

Next, 317.3 g (concentration of solid contents: 41.0% by mass) of the obtained polymerization solution was weighed, 46.4 g of isopropanol, 1.65 g of a 20% maleic acid anhydride aqueous solution (water-soluble acidic compound, corresponding to 0.3% by mass as maleic acid with respect to the copolymer), and 40.77 g of a 2 mol/L NaOH aqueous solution were added to the solution, and the temperature of the liquid in the reaction container was increased to 70° C.

Next, 380 g of distilled water was added dropwise to the solution, which had been heated to 70° C., at a speed of 10 ml/min, and water dispersion was performed (dispersion step).

Thereafter, a total amount of 287.0 g of isopropanol, methyl ethyl ketone, and distilled water was distilled off by maintaining the temperature of the liquid in the reaction container at 70° C. for 1.5 hours under reduced pressure (solvent removal step).

0.278 g (440 ppm as benzisothiazolin-3-one as the solid content in the polymer) of PROXEL GXL (S) (manufactured by Arch Chemicals, Inc.) was added to the obtained solution.

The obtained liquid was filtered using a filter having a mesh diameter of 1 μm, and the filtrate was collected, thereby obtaining an aqueous dispersion of the polymer particles whose concentration of solid contents was 26.5% by mass.

Examples 1A to 25A and Comparative Examples 1A to 4A, and Examples 1B to 25B and Comparative Examples 1B to 4B (Preparation of Pretreatment Liquid)

Respective components described in the section of "composition of pretreatment liquid" below were mixed to prepare pretreatment liquids of Examples 1A to 25A and Comparative Examples 1A to 4A, and Examples 1B to 25B and Comparative Examples 1B to 4B. Further, the pretreatment liquid 1 (Examples 1A to 25A and Comparative Examples 1A to 4A) did not contain an aggregating agent, and the pretreatment liquid 2 (Examples 1B to 25B and Comparative Examples 1B to 4B) contained malonic acid as an aggregating agent.

Further, the resin a and the resin b formed core-shell particles in Examples 23A to 25A and Examples 23B to 25B, the core shell particles D1 described above were used in Examples 23A and 23B, the core shell particles D2 described above were used in Examples 24A and 24B, and the core shell particles D3 described above were used in Examples 25A and 25B.

<Composition of Pretreatment Liquid>

—Pretreatment Liquid 1—

Aqueous dispersion of resin (Examples 1A to 22A) or aqueous dispersion of core shell particles (Examples 23A to 25A): the kinds of resin a and resin b listed in Table 7, total solid content of 10.0% by mass
Polymer glycol (PG): 10.0% by mass
Antifoaming agent (TSA-739 (15%), manufactured by Momentive Performance Materials Japan LLC, emulsion type silicone antifoaming agent): 0.01% by mass as the solid content of the antifoaming agent
Ion exchange water: remaining amount set such that the total amount of the composition was 100% by mass —Pretreatment Liquid 2—

Aqueous dispersion of resin (Examples 1B to 22B) or aqueous dispersion of core shell particles (Examples 23B to 25B): the kinds of resin a and resin b listed in Table 8, total solid content of 10.0% by mass
Malonic acid: 5.5% by mass
Polymer glycol (PG): 10.0% by mass
Antifoaming agent (TSA-739 (15%), manufactured by Momentive Performance Materials Japan LLC, emulsion type silicone antifoaming agent): 0.01% by mass as the solid content of the antifoaming agent Ion exchange water: remaining amount set such that the total amount of the composition was 100% by mass <Image Recording and Evaluation>

After the pretreatment liquids of Examples 1A to 25A and Comparative Examples 1A to 4A, and Examples 1B to 25B and Comparative Examples 1B to 4B were applied to the impermeable base materials listed in Table 7 or Table 8, images were recorded, and then various evaluations described below were performed. Further, the evaluation results for the pretreatment liquid 1 of Examples 1A to 25A and Comparative Examples 1A to 4A are listed in Table 7, and the evaluation results for the pretreatment liquid 2 of Examples 1B to 25B and Comparative Examples 1B to 4B are listed in Table 8.

Further, in a case where the pretreatment liquid 1 was used, the blocking resistance was evaluated by visually confirming whether the pretreatment liquid was transferred to the rear surface of the impermeable base material. Further, in a case where the pretreatment liquid 2 containing an aggregating agent was used, the aggregating agent blocking resistance was evaluated by calculating the amount (mg/dm$^2$) of the pretreatment liquid to be transferred to the rear surface of the impermeable base material as the extraction amount of the impermeable base material per unit area.

The results are listed in Table 7 or Table 8.

(Evaluation)

<Evaluation of Blocking Resistance>

In Examples 1A to 25A and Comparative Examples 1A to 4A, the impermeable base material (with a width of 500 mm and a length of 2000 m) listed in Table 7 was transported at 500 mm/sec, coated with the pretreatment liquid 1 listed in Table 7 such that the coating amount thereof was set to 1.7 g/m$^2$ using a wire bar coater, dried with warm air at a film surface temperature of 80° C. for 20 seconds, wound in a roll shape such that the surface pressure was set to 50 kPa, and allowed to stand at room temperature (25° C.) for 1 day. Thereafter, the base material was unwound, and visual confirmation whether the pretreatment liquid 1 was transported to the rear surface of the impermeable base material in contact with the coating surface was made.

Specifically, an A4-sized rectangular region at a position of 1000 μm from the wound end portions in the length direction (29.7 cm in the length direction of the impermeable base material, and 21 cm in the width direction of the impermeable base material) was cut out from the base material, and transfer of the components contained in the pretreatment liquid 1 in the region was visually confirmed.

The cut-out position in the length direction was set to be the center in the length direction of the A4-sized region at the position of 1000 m.

The cut-out position in the width direction was such that the center of the A4-sized cut-out region in the width direction was the center of the impermeable base material in the width direction.

The evaluation was performed according to the following evaluation standards, and the results are listed in Table 7.

In the following evaluation standards, a case where the stickiness of the surface of the image was most suppressed, that is, the blocking resistance was most excellent was evaluated as "AA".

—Evaluation Standards—

AA: The transfer of the components of the pretreatment liquid could not be confirmed over the entire A4-sized rear surface of the impermeable base material, and the visibility of the transparent portion of the impermeable base material was not impaired.

A: The transfer of the components of the pretreatment liquid was confirmed over the entire A4-sized rear surface of the impermeable base material, and the confirmed area was greater than 0% and less than 15% in the entire area of the rear surface of the impermeable base material, and the transparency of the impermeable base material was slightly impaired.

B: The transfer of the components of the pretreatment liquid was confirmed over the entire A4-sized rear surface of the impermeable base material, and the confirmed area was 15% or greater and less than 30% in the entire area of the rear surface of the impermeable base material, and the transparency of the impermeable base material was slightly impaired.

C: The transfer of the components of the pretreatment liquid was confirmed over the entire A4-sized rear surface of the impermeable base material, and the confirmed area was 30% or greater and less than 50% in the entire area of the rear surface of the impermeable base material, and the transparency of the impermeable base material was significantly impaired.

D: The transfer of the components of the pretreatment liquid was confirmed over the entire A4-sized rear surface of the impermeable base material, and the confirmed area was 50% or greater and less than 70% in the entire area of the rear surface of the impermeable base material, and the transparency of the impermeable base material was significantly impaired.

E: The transfer of the components of the pretreatment liquid was confirmed over the entire A4-sized rear surface of the impermeable base material, and the confirmed area was 70% or greater in the entire area of the rear surface of the impermeable base material, and the transparency of the impermeable base material was significantly impaired.

<Evaluation of Aggregating Agent Blocking Resistance>

The aggregating agent blocking resistance was evaluated according to the same method as that for the evaluation of the blocking resistance except that the transfer amount of the components contained in the pretreatment liquid 2 listed in Table 8 was evaluated according to the following measuring method using the impermeable base material listed in Table 8 in Examples 1B to 25B and Comparative Examples 1B to 4B in place of the visual observation of the transfer of the components contained in the pretreatment liquid 1 listed in Table 7 using the impermeable base material listed in Table 7 in the blocking resistance evaluation.

[Method of Measuring Transfer Amount]

The measurement was performed using MigraCell (registered trademark) MC150 (manufactured by FABES Forschungs-GmbH).

Specifically, the surface of the impermeable base material opposite to the surface coated with the pretreatment liquid 2 in the above-described cut rectangular region was set to be an extraction surface in MC150, 20 mL of a solvent (methanol/water=1:1 (volume ratio)) was added thereto, MC150 was covered with a lid, and the base material was allowed to stand for 1 day. The set position was set to a position where the center of the rectangular region and the center of the extraction region in MC150 visually overlapped each other.

After the base material was allowed to stand, the extraction amount (transfer amount, mg/dm$^2$) of the impermeable base material per unit area was calculated by dividing the mass of the dried material of the solvent after being taken out and dried by the extraction area (2.0 dm$^2$).

[Evaluation Standards]

The evaluation standards are formed of the following six ranks AA to E, and the evaluation results are listed in Table 8.

AA: Transfer was not able to be visually confirmed, and the transfer amount was 0.01 mg/dm² or less.

A: Transfer was not able to be visually confirmed, and the transfer amount was greater than 0.01 mg/dm² and 0.25 mg/dm² or less.

B: Transfer was not able to be visually confirmed, and the transfer amount was greater than 0.25 mg/dm² and 0.5 mg/dm² or less.

C: Transfer was not able to be visually confirmed, and the transfer amount was greater than 0.5 mg/dm² and 5 mg/dm² or less.

D: Transferred materials were able to be partially visually confirmed.

E: Transferred materials were able to be visually confirmed over the entire surface.

<Evaluation of Adhesiveness>

In Examples 1A to 25A and Comparative Examples 1A to 4A, and Examples 1B to 25B and Comparative Examples 1B to 4B, the impermeable base material (width of 500 mm, length of 2000 m) listed in Table 7 or 8 was transported at 635 mm/sec, coated with the pretreatment liquid listed in Table 7 or 8 such that the coating amount thereof was approximately 1.7 g/m² using a wire bar coater, and dried at 50° C. for 2 seconds immediately after the coating. Thereafter, a blue (cyan ink+magenta ink) color solid image was printed using the prepared cyan ink and magenta ink described above under the following image recording conditions. Immediately after printing, the solid image was dried on a hot plate at 80° C. for 30 seconds to form an image.

The adhesiveness of the image was evaluated by attaching Cellotape (registered trademark) (No. 405, manufactured by Nichiban Co., Ltd., width of 12 mm, hereinafter, also simply referred to as "tape") to the obtained image and peeling the tape from the image. It can be said that the peeling of the image is suppressed as the evaluation results for the adhesiveness are more excellent.

Specifically, the attachment of the tape was performed according to the following method.

The tape was taken out at a constant speed and cut into a small piece having a length of approximately 75 mm.

The tape was superimposed on the image, and a region with a width of 12 mm and a length of 25 mm at the center of the tape which had been cut into a small piece was attached using a finger.

The tape was firmly rubbed with the fingertip in order to appropriately bring the tape into contact with the coated film.

The end of the tape was grabbed at an angle as close to 60° as possible in 5 minutes after attachment of the tape, and the tape was securely separated within 0.5 to 1.0 seconds.

[Image Recording Conditions]

Head: A head in which four colors of 1200 dpi (dot per inch, 1 inch indicates 2.54 cm)/20-inch width piezo full line heads were disposed was used.

Jet liquid droplet amount: Each amount was set to 2.4 µL.

Driving frequency: 30 kHz (base material transport speed of 635 mm/sec)

[Evaluation Standards]

The evaluation was performed based on the following evaluation standards, and the evaluation results are listed in Table 7 or 8.

AA: The area (%) of the coated surface remaining on the impermeable base material was in a range of 95% to 100%.

A: The area (%) of the coated surface remaining on the impermeable base material was 90% or greater and less than 95%.

B: The area (%) of the coated surface remaining on the impermeable base material was 70% or greater and less than 90%.

C: The area (%) of the coated surface remaining on the impermeable base material was 50% or greater and less than 70%.

D: The area (%) of the coated surface remaining on the impermeable base material was 30% or greater and less than 50%.

E: The area (%) of the coated surface remaining on the impermeable base material was less than 30%.

TABLE 7

|  | Particles of resin b | | | Resin a | | |
|---|---|---|---|---|---|---|
|  | Type | Tg[° C.] | Pretreatment liquid 1 HSP distance between resin and aqueous medium | Type | Tg[° C.] | Pretreatment liquid 1 HSP distance between resin and aqueous medium |
| Example 1A | A8 | 54 | 38.90 | A2 | 6 | 39.23 |
| Example 2A | A8 | 54 | 38.90 | A2 | 6 | 39.23 |
| Example 3A | A8 | 54 | 38.90 | A2 | 6 | 39.23 |
| Example 4A | A8 | 54 | 38.90 | A2 | 6 | 39.23 |
| Example 5A | A8 | 54 | 38.90 | A2 | 6 | 39.23 |
| Example 6A | A8 | 54 | 38.90 | A2 | 6 | 39.23 |
| Example 7A | A8 | 54 | 38.90 | A2 | 6 | 39.23 |
| Example 8A | A8 | 54 | 38.90 | A2 | 6 | 39.23 |
| Example 9A | A8 | 54 | 38.90 | A1 | −7 | 38.89 |
| Example 10A | A8 | 54 | 38.90 | A5 | 22 | 39.38 |
| Example 11A | A6 | 27 | 35.50 | A2 | 6 | 39.23 |
| Example 12A | A10 | 93 | 39.60 | A2 | 6 | 39.23 |
| Example 13A | A8 | 54 | 38.90 | A4 | 17 | 35.75 |
| Example 14A | A9 | 71 | 35.89 | A2 | 6 | 39.23 |
| Example 15A | A9 | 71 | 35.89 | E1 | 19 | 34.91 |
| Example 16A | A7 | 48 | 34.67 | U2 | 18 | 35.54 |
| Example 17A | E2 | 64 | 34.17 | E1 | 19 | 34.91 |
| Example 18A | E2 | 64 | 3417 | A3 | 11 | 33.77 |
| Example 19A | E2 | 64 | 3417 | U1 | 14 | 35.40 |

TABLE 7-continued

| | | | | | | |
|---|---|---|---|---|---|---|
| Example 20A | U3 | 44 | 35.81 | E1 | 19 | 34.91 |
| Example 21A | U3 | 44 | 35.81 | A4 | 17 | 35.75 |
| Example 22A | U3 | 44 | 35.81 | U2 | 18 | 35.54 |
| Core shell particles (Examples 23A to 25A) | | | | | | |
| Example 23A | A11 | 53 | 39.60 | A2 | 6 | 39.23 |
| Example 24A | A12 | 72 | 34.97 | E1 | 19 | 34.91 |
| Example 25A | A13 | 49 | 33.82 | U2 | 18 | 35.54 |
| Comparative Example 1A | SUPERFLEX 500M | 47 | — | — | — | — |
| Comparative Example 2A | — | — | — | SUPERFLEX 650 | −17 | — |
| Comparative Example 3A | C1 | 140 | 34.84 | — | — | — |
| Comparative Example 3A | C1 | 140 | 34.84 | — | — | — |
| Comparative Example 4A | C2 | 100 | 37.07 | | | |

| | Difference in Tg between resin b and resin a [° C.] | Resin particles b:resin a (% by mass) | HSP distance between resin b and resin a | Impermeable base material | Evaluation | |
|---|---|---|---|---|---|---|
| | | | | | Blocking resistance | Adhesiveness |
| Example 1A | 48 | 1:1 | 1.90 | A | D | B |
| Example 2A | 48 | 1.5:1 | 1.90 | A | C | B |
| Example 3A | 48 | 4:1 | 1.90 | A | AA | A |
| Example 4A | 48 | 20:1 | 1.90 | A | AA | A |
| Example 5A | 48 | 100:1 | 1.90 | A | C | B |
| Example 6A | 48 | 4:1 | 1.90 | B | AA | A |
| Example 7A | 48 | 4:1 | 1.90 | C | AA | A |
| Example 8A | 48 | 4:1 | 1.90 | D | AA | A |
| Example 9A | 61 | 4:1 | 1.53 | A | B | B |
| Example 10A | 32 | 4:1 | 1.32 | A | B | C |
| Example 11A | 21 | 4:1 | 0.89 | A | C | B |
| Example 12A | 87 | 4:1 | 1.04 | A | B | B |
| Example 13A | 37 | 4:1 | 4.76 | A | D | D |
| Example 14A | 65 | 4:1 | 6.86 | A | D | D |
| Example 15A | 52 | 4:1 | 1.42 | A | B | B |
| Example 16A | 30 | 4:1 | 1.63 | A | D | C |
| Example 17A | 45 | 4:1 | 0.88 | A | C | B |
| Example 18A | 53 | 4:1 | 1.80 | A | B | B |
| Example 19A | 50 | 4:1 | 1.87 | A | D | C |
| Example 20A | 25 | 4:1 | 1.52 | A | D | B |
| Example 21A | 27 | 4:1 | 1.92 | A | C | B |
| Example 22A | 26 | 4:1 | 1.41 | A | D | C |
| Core shell particles (Examples 23A to 25A) | | | | | | |
| Example 23A | 47 | 4:1 | 1.85 | A | AA | AA |
| Example 24A | 53 | 4:1 | 1.88 | A | A | A |
| Example 25A | 31 | 4:1 | 1.92 | A | C | B |
| Comparative Example 1A | — | 1:0 | — | A | E | E |
| Comparative Example 2A | — | 1:0 | — | A | E | E |
| Comparative Example 3A | — | 1:0 | — | A | E | E |
| Comparative Example 4A | — | — | — | A | E | E |

TABLE 8

| | Particles of resin b | | Pretreatment liquid 2 HSP distance between resin and aqueous medium | Resin a | | Pretreatment liquid 2 HSP distance between resin and aqueous medium |
|---|---|---|---|---|---|---|
| | Type | Tg[° C.] | | Type | Tg[° C.] | |
| Example 1B | A8 | 54 | 38.75 | A2 | 6 | 39.08 |
| Example 2B | A8 | 54 | 38.75 | A2 | 6 | 39.08 |
| Example 3B | A8 | 54 | 38.75 | A2 | 6 | 39.08 |
| Example 4B | A8 | 54 | 38.75 | A2 | 6 | 39.08 |
| Example 5B | A8 | 54 | 38.75 | A2 | 6 | 39.08 |
| Example 6B | A8 | 54 | 38.75 | A2 | 6 | 39.08 |
| Example 7B | A8 | 54 | 38.75 | A2 | 6 | 39.08 |

TABLE 8-continued

| | | | | | | |
|---|---|---|---|---|---|---|
| Example 8B | A8 | 54 | 38.75 | A2 | 6 | 39.08 |
| Example 9B | A8 | 54 | 38.75 | A1 | −7 | 38.74 |
| Example 10B | A8 | 54 | 38.75 | A5 | 22 | 39.23 |
| Example 11B | A6 | 27 | 35.35 | A2 | 6 | 39.08 |
| Example 12B | A10 | 93 | 39.45 | A2 | 6 | 39.08 |
| Example 13B | A8 | 54 | 38.75 | A4 | 17 | 35.60 |
| Example 14B | A9 | 71 | 35.74 | A2 | 6 | 39.08 |
| Example 15B | A9 | 71 | 35.74 | E1 | 19 | 34.76 |
| Example 16B | A7 | 48 | 34.52 | U2 | 18 | 35.39 |
| Example 17B | E2 | 64 | 34.02 | E1 | 19 | 34.76 |
| Example 18B | E2 | 64 | 34.02 | A3 | 11 | 33.62 |
| Example 19B | E2 | 64 | 34.02 | U1 | 14 | 35.25 |
| Example 20B | U3 | 44 | 35.66 | E1 | 19 | 34.76 |
| Example 21B | U3 | 44 | 35.66 | A4 | 17 | 35.60 |
| Example 22B | U3 | 44 | 35.66 | U2 | 18 | 35.39 |
| Core shell particles (Examples 23A to 25A) | | | | | | |
| Example 23B | A11 | 53 | 39.49 | A2 | 6 | 39.23 |
| Example 24B | A12 | 72 | 34.82 | E1 | 19 | 34.91 |
| Example 25B | A13 | 49 | 33.67 | U2 | 18 | 35.54 |
| Comparative Example 1B | SUPERFLEX 500M | 47 | — | — | — | — |
| Comparative Example 2B | — | — | — | SUPERFLEX 650 | −17 | — |
| Comparative Example 3B | C1 | 140 | 34.69 | — | — | — |
| Comparative Example 4B | C1 C2 | 140 100 | 34.69 36.92 | — | — | — |

| | Difference in Tg between resin b and resin a [° C.] | Resin particles b:resin a (% by mass) | HSP distance between resin b and resin a | Impermeable base material | Evaluation | |
|---|---|---|---|---|---|---|
| | | | | | Blocking resistance | Adhesiveness |
| Example 1B | 48 | 1:1 | 1.90 | A | D | B |
| Example 2B | 48 | 1.5:1 | 1.90 | A | C | B |
| Example 3B | 48 | 4:1 | 1.90 | A | AA | A |
| Example 4B | 48 | 20:1 | 1.90 | A | AA | A |
| Example 5B | 48 | 100:1 | 1.90 | A | C | B |
| Example 6B | 48 | 4:1 | 1.90 | B | AA | A |
| Example 7B | 48 | 4:1 | 1.90 | C | AA | A |
| Example 8B | 48 | 4:1 | 1.90 | D | AA | A |
| Example 9B | 61 | 4:1 | 1.53 | A | B | B |
| Example 10B | 32 | 4:1 | 1.32 | A | B | C |
| Example 11B | 21 | 4:1 | 0.89 | A | C | B |
| Example 12B | 87 | 4:1 | 1.04 | A | B | B |
| Example 13B | 37 | 4:1 | 4.76 | A | D | D |
| Example 14B | 65 | 4:1 | 6.86 | A | D | D |
| Example 15B | 52 | 4:1 | 1.42 | A | B | B |
| Example 16B | 30 | 4:1 | 1.63 | A | D | C |
| Example 17B | 45 | 4:1 | 0.88 | A | C | B |
| Example 18B | 53 | 4:1 | 1.80 | A | B | B |
| Example 19B | 50 | 4:1 | 1.87 | A | D | C |
| Example 20B | 25 | 4:1 | 1.52 | A | D | B |
| Example 21B | 27 | 4:1 | 1.92 | A | C | B |
| Example 22B | 26 | 4:1 | 1.41 | A | D | C |
| Core shell particles (Examples 23A to 25A) | | | | | | |
| Example 23B | 47 | 4:1 | 1.85 | A | AA | AA |
| Example 24B | 53 | 4:1 | 1.88 | A | A | A |
| Example 25B | 31 | 4:1 | 1.92 | A | C | B |
| Comparative Example 1B | — | 1:0 | — | A | E | E |
| Comparative Example 2B | — | 1:0 | — | A | E | E |
| Comparative Example 3B | — | 1:0 | — | A | E | E |
| Comparative Example 4B | — | — | — | A | E | E |

In Table 7 or 8, "-" in the columns indicates that no component is contained.

Details of each component in Table 7 or Table 8 are as follows.

A1 to A13: The components are the same as A1 to A13 described in the section of the acrylic resin above.

In a case of using A1 to A10 as the resin b, the components were used as a dispersion liquid of particles having a volume average particle diameter of 20 nm to 120 nm.

E1 and E2: The components are the same as E1 and E2 described in the section of the ester resin above.

U1 to U3: The components are the same as U1 to U3 described in the section of the urethane resin above.

C1 and C2: The components are the same as C1 and C2 described in the section of the synthesis of the acrylic resin above.

SUPERFLEX 500M: (urethane resin, manufactured by DKS Co., Ltd.)

SUPERFLEX 650: (urethane resin, manufactured by DKS Co., Ltd.)

~Base Material~

A: FE2001 (25 µm, resin base material, polyethylene terephthalate (PET) base material, manufactured by Futamura Chemical Co., Ltd.)

B: Pyrene (registered trademark) film ST P6181 (25 µm, biaxially oriented polypropylene (OPP), manufactured by Toyobo Co., Ltd.)

C: Emblem (registered trademark) ON-25 (25 µm, nylon, manufactured by Unitika Ltd.)

D: LL-RP2 (30 µm, polyethylene, manufactured by Futamura Chemical Co., Ltd.) and the like.

In the present example, the HSP distance was calculated according to the same method as the calculation method for the HSP distance described above.

In the calculation of the HSP distance between the aqueous medium and the resin a and the resin b in Table 7, the mass ratio between water and PG in the pretreatment liquid 1 was calculated to be 79.999:10. In the calculation of the HSP distance between the aqueous medium and the resin a and the resin b in Table 8, the mass ratio between water and PG in the pretreatment liquid 2 was calculated to be 74.49:10.

The mixing ratio between C1 and C2 (C1:C2) in Comparative Examples 4A and 4B is 4:1 on a mass basis.

In Examples 1 to 22 in which the pretreatment liquid containing water, the resin a having a glass transition temperature of lower than 25° C., and the particles of the resin b having a glass transition temperature of 25° C. or greater, the blocking resistance, the aggregating agent blocking resistance, and the adhesiveness were excellent.

Among these, in Examples 2 to 22 in which the mass ratio between the resin b and the resin a was in a range of 1.5:1 to 100:1, the blocking resistance and the aggregating agent blocking resistance were excellent. Further, in Examples 3, 4, and Examples 6 to 22 in which the mass ratio between the resin b and the resin a was in a range of 4:1 to 20:1, the blocking resistance and the aggregating agent blocking resistance were more excellent.

In Examples 1 to 9 and 12 to 22 in which the glass transition temperature of the resin b was 30° C. or higher and the glass transition temperature of the resin a was 20° C. or lower, all the blocking resistance, the aggregating agent blocking resistance, and the adhesiveness were satisfactory. In the examples other than Example 9 in which the glass transition temperature of the resin a was in a range of 0° C. to 20° C., the adhesiveness was more excellent.

In Examples 6, 7, and 8 in which the glass transition temperature of the resin b was in a range of 30° C. to 90° C., all the blocking resistance, the aggregating agent blocking resistance, and the adhesiveness were more satisfactory as compared with Examples 11 and 12 in which the glass transition temperature of the resin b was out of a range of 30° C. to 90° C.

In the examples other than Example 13 and Example 14 in which the absolute value of the difference in Hansen solubility parameter between the resin b and the resin a was in a range of 0 to 2, all the blocking resistance, the aggregating agent blocking resistance, and the adhesiveness were more satisfactory.

In Examples 1 to 15, 17, and Example 18 in which the resin b and the resin a were acrylic resins or ester resins, all the blocking resistance, the aggregating agent blocking resistance, and the adhesiveness were more satisfactory.

In Examples 23 to 25 in which the core shell particles containing the resin a and the particles of the resin b were used, the adhesiveness was excellent.

The disclosure of JP2018-069655 filed on Mar. 30, 2018 is incorporated herein by reference in its entirety.

In a case where all documents, patent applications, and technical standards described in the present specification are specified to be incorporated specifically and individually as cited documents, the documents, patent applications, and technical standards are incorporated herein in the same limited scope as the cited documents.

What is claimed is:

1. A pretreatment liquid for recording an image on an impermeable base material with an aqueous ink, the pretreatment liquid comprising:
    an aqueous medium;
    a resin a having a glass transition temperature of lower than 25° C.; and
    particles of a resin b having a glass transition temperature of 25° C. or higher.

2. The pretreatment liquid according to claim 1, wherein a mass ratio (b:a) of the resin b to the resin a is in a range of 1.5:1 to 100:1.

3. The pretreatment liquid according to claim 1, wherein the mass ratio b:a of the resin b to the resin a is in a range of 3:1 to 20:1.

4. The pretreatment liquid according to claim 1, wherein the glass transition temperature of the resin b is 30° C. or higher, and the glass transition temperature of the resin a is 20° C. or lower.

5. The pretreatment liquid according to claim 1, wherein a difference between the glass transition temperature of the resin b and the glass transition temperature of the resin a is 15° C. or higher.

6. The pretreatment liquid according to claim 1, wherein the glass transition temperature of the resin a is in a range of 0° C. to 20° C.

7. The pretreatment liquid according to claim 1, wherein the glass transition temperature of the resin b is in a range of 30° C. to 90° C.

8. The pretreatment liquid according to claim 1, wherein a distance of a Hansen solubility parameter between the resin b and the resin a is in a range of 0 $MPa^{1/2}$ to 2 $MPa^{1/2}$.

9. The pretreatment liquid according to claim 1, wherein a distance of the Hansen solubility parameter between the resin b and the aqueous medium is in a range of 33 $MPa^{1/2}$ to 41 $MPa^{1/2}$.

10. The pretreatment liquid according to claim 1, wherein the resin b is an ester resin or an acrylic resin.

11. The pretreatment liquid according to claim 1, wherein the resin a is an ester resin or an acrylic resin.

12. The pretreatment liquid according to claim 1, wherein the resin a and the resin b are acrylic resins.

13. The pretreatment liquid according to claim 1, further comprising:
    at least one aggregating agent selected from the group consisting of a polyvalent metal salt, an organic acid, and a metal complex.

14. The pretreatment liquid according to claim 1, wherein the pretreatment liquid contains core shell particles containing the resin a as a shell and the particles of the resin b as a core.

15. An ink set comprising:
an ink composition containing a colorant and water; and
the pretreatment liquid according to claim 1.

16. A base material for image recording, comprising:
an impermeable base material; and
a pretreatment layer containing a solid content of the pretreatment liquid according to claim 1, is the pretreatment layer provided on at least one surface of the impermeable base material.

17. A base material for image recording with an aqueous ink, comprising:
an impermeable base material; and
a pretreatment layer which includes a resin a having a glass transition temperature of lower than 25° C. and particles of a resin b having a glass transition temperature of 25° C. or higher.

18. An image recorded material comprising:
the base material for image recording according to claim 16; and
an image containing a colorant.

19. A method of producing a base material for image recording, comprising:
a step of adding the pretreatment liquid according to claim 1 onto an impermeable base material.

20. An image recording method comprising:
a step of adding the pretreatment liquid according to claim 1 onto an impermeable base material; and
a step of allowing an ink composition containing a colorant and water to be jetted according to an ink jet method onto a surface of the impermeable base material onto which the pretreatment liquid has been applied and recording an image.

* * * * *